United States Patent
Lim et al.

(10) Patent No.: US 9,351,099 B2
(45) Date of Patent: May 24, 2016

(54) SCHEDULING METHOD IN WIRELESS COMMUNICATION SYSTEM AND DEVICE THEREFOR

(71) Applicant: LG ELECTRONICS INC., Seoul (KR)

(72) Inventors: Jaewon Lim, Anyang-si (KR); Suhwook Kim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 14/352,985

(22) PCT Filed: Oct. 18, 2012

(86) PCT No.: PCT/KR2012/008553
§ 371 (c)(1),
(2) Date: Apr. 18, 2014

(87) PCT Pub. No.: WO2013/058577
PCT Pub. Date: Apr. 25, 2013

(65) Prior Publication Data
US 2014/0247817 A1    Sep. 4, 2014

Related U.S. Application Data

(60) Provisional application No. 61/548,231, filed on Oct. 18, 2011.

(51) Int. Cl.
*H04J 3/00* (2006.01)
*H04W 4/00* (2009.01)
(Continued)

(52) U.S. Cl.
CPC .......... *H04W 4/008* (2013.01); *H04W 52/0216* (2013.01); *H04W 72/0446* (2013.01); *H04L 1/0079* (2013.01); *H04W 72/12* (2013.01); *H04W 84/10* (2013.01); *H04W 84/18* (2013.01)

(58) Field of Classification Search
CPC .................... H04W 72/1252; H04W 72/0413; H04W 52/0216; H04W 4/008
USPC .................................................... 370/336, 461
See application file for complete search history.

(56) References Cited

U.S. PATENT DOCUMENTS

2009/0168744 A1*  7/2009  Park ................. H04W 74/006
                                                370/349
2011/0038343 A1*  2/2011  Bhatti ................ H04W 28/06
                                                370/330

(Continued)

FOREIGN PATENT DOCUMENTS

KR    1020080057870    6/2008
KR      100918003      9/2009

OTHER PUBLICATIONS

Han, et al., "GTS Allocation Scheme of IEEE 802.15.4 for Energy-efficiency", Jan. 2009, 4 pages.

(Continued)

*Primary Examiner* — Wanda Z Russell
(74) *Attorney, Agent, or Firm* — Lee Hong Degerman Kang & Waimey; Jonathan Kang; Jeffrey Lotspeich

(57) ABSTRACT

The present invention provides a scheduling method in a wireless personal area network (WPAN) system and a device therefor. Specifically, a method for allocating a guaranteed time slot (GTS) in a WPNA system comprises the steps of: receiving a GTS request command for requesting periodic GTS allocation from a device; and transmitting a beacon frame which includes periodic GTS allocation information to the device, wherein a GTS allocation interval is determined by GTS interval information included in the GTS request command, and an allocated periodic GTS expires if data or an acknowledgement (ACK) frame is not transmitted from the device within a section determined by the GTS allocation interval.

16 Claims, 16 Drawing Sheets

(51) Int. Cl.
*H04W 52/02* (2009.01)
*H04W 72/04* (2009.01)
*H04W 84/18* (2009.01)
*H04W 72/12* (2009.01)
*H04W 84/10* (2009.01)
*H04L 1/00* (2006.01)

(56) References Cited

U.S. PATENT DOCUMENTS

| | | | |
|---|---|---|---|
| 2012/0093056 A1* | 4/2012 | Shin | H04W 80/00 370/312 |
| 2012/0155349 A1* | 6/2012 | Bajic | H04W 4/008 370/311 |
| 2012/0236876 A1* | 9/2012 | Vijayasankar | H04L 12/2838 370/461 |
| 2014/0192696 A1* | 7/2014 | Wang | H04W 72/1252 370/311 |

OTHER PUBLICATIONS

Yoo, et al., "Scheduling Support for Guaranteed Time Services in IEEE 802.15.4 Low Rate WPAN", IEEE International Conference on Embedded and Real-Time Computing Systems and Applications (RTCSA'05), Jan. 2005, 7 pages.

Lee, et al., "A Class Based GTS Scheduling Method in Sensor Networks", Dec. 2010, 9 pages.

Park, et al., "An Adaptive GTS Allocation Scheme to Increase Bandwidth Utilization in IEEE 802.15.4", Journal of Korea Multimedia Society vol. 14 No. 2, Feb. 2011, 9 pages.

PCT International Application No. PCT/KR2012/008553, Written Opinion of the International Searching Authority dated Mar. 27, 2013, 10 pages.

* cited by examiner (a)    (b)

SCHEDULING METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2012/008553, filed on Oct. 18, 2012, which claims the benefit of U.S. Provisional Application Ser. No. 61/548,231, filed on Oct. 18, 2011, the contents of which are all hereby incorporated by reference herein in their entirety.

TECHNICAL FIELD

The present invention relates to a wireless communication system, and more particularly, to a method of scheduling a transmission band in a WPAN (wireless personal area network) and an apparatus therefor.

BACKGROUND ART

Personal mobile devices can perform a communication by constructing an LR-WPAN (low-rate wireless personal area networks). As an example of the LR-WPAN, there is a network following IEEE 802.15.4 standard. IEEE 802.15.4 standard provides transmission speed of 20 Kbps and 40 Kbps on 868/915 MHz band using a BPSK (binary phase-shift keying) and provides transmission speed of 250 Kbps on 2.45 GHz band using an O-QPSK (offset quadrature phase-shift keying). IEEE 802.15.4b standard also provides transmission speed of 250 Kbps on 868/915 MHz band using the O-QPSK.

DISCLOSURE OF THE INVENTION

Technical Tasks

One object of the present invention is to provide a method of smoothly transmitting and receiving data between a coordinator and a device in a wireless communication system, preferably, a WPAN (wireless personal area network) system and an apparatus therefor.

Another object of the present invention is to provide a method of smoothly scheduling a transmission band for a device in a WPAN system and an apparatus therefor.

The other object of the present invention is to provide a method of reducing power consumption of a device implemented in a WPAN system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, disclosed herein is a method of allocating a GTS (guaranteed time slot) in a WPAN (wireless personal area network) system includes the steps of receiving a GTS request command for requesting allocation of a periodic GTS from a device and transmitting a beacon frame including periodic GTS allocation information to the device, wherein a GTS allocation period is determined by GTS interval information included in the GTS request command, and wherein if data or an ACK (acknowledgement) frame is not transmitted from the device within an interval determined by the GTS allocation period, an allocated periodic GTS expires.

In another aspect of the present invention, disclosed herein is a coordinator allocating a GTS (guaranteed time slot) in a WPAN (wireless personal area network) system includes an RF (radio frequency) unit configured to transceive a radio signal, and a processor configured to receive a GTS request command for requesting allocation of a periodic GTS from a device and transmit a beacon frame including periodic GTS allocation information to the device, wherein a GTS allocation period is determined by GTS interval information included in the GTS request command, and wherein if data or an ACK (acknowledgement) frame is not transmitted from the device within an interval determined by the GTS allocation period, an allocated periodic GTS expires.

Preferably, the interval determined by the GTS allocation period corresponds to (2×n) superframe, and a value n is determined by the GTS allocation period.

Preferably, the GTS allocation period is determined by exponentiating the GTS interval information.

Preferably, information on whether allocation of the periodic GTS is supported is transmitted to the device via the beacon frame.

Preferably, the beacon frame includes a GTS specification field, and the GTS specification field includes a periodic GTS permit subfield indicating whether the allocation of the periodic GTS is supported.

In an aspect of the present invention, disclosed herein is a method of receiving allocation of a GTS (guaranteed time slot) in a WPAN (wireless personal area network) system includes the steps of transmitting a GTS request command for requesting allocation of a periodic GTS to a coordinator; and receiving a beacon frame including periodic GTS allocation information from the coordinator, wherein a GTS allocation period is determined by GTS interval information included in the GTS request command, and wherein if data or an ACK (acknowledgement) frame is not transmitted from the device within an interval determined by the GTS allocation period, an allocated periodic GTS expires.

In another aspect of the present invention, disclosed herein is a device receiving allocation of a GTS (guaranteed time slot) in a WPAN (wireless personal area network) system includes an RF (radio frequency) unit configured to transceive a radio signal, and a processor configured to transmit a GTS request command for requesting allocation of a periodic GTS to a coordinator and receive a beacon frame including periodic GTS allocation information from the coordinator, wherein a GTS allocation period is determined by GTS interval information included in the GTS request command, and wherein if data or an ACK (acknowledgement) frame is not transmitted from the device within an interval determined by the GTS allocation period, an allocated periodic GTS expires.

Preferably, the interval determined by the GTS allocation period corresponds to (2×n) superframe, and a value n is determined by the GTS allocation period.

Preferably, the GTS allocation period is determined by exponentiating the GTS interval information.

Preferably, information on whether allocation of the periodic GTS is supported is received from the coordinator via the beacon frame.

Preferably, the beacon frame includes a GTS specification field, and the GTS specification field includes a periodic GTS permit subfield indicating whether the allocation of the periodic GTS is supported.

Advantageous Effects

According to embodiment of the present invention, data can be smoothly transceived between a coordinator and a device in a wireless communication system, preferably, a WPAN system.

According to embodiment of the present invention, a transmission band for a device can be smoothly scheduled by defining a method of allocating a periodic transmission band and making the periodic transmission band to be expired in a WPAN system.

According to embodiment of the present invention, unnecessary operation of a device can be avoided via an expiration timing of a transmission band synchronized between the device and a coordinator in a WPAN system, thereby reducing power consumption of the device.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Figure 1:
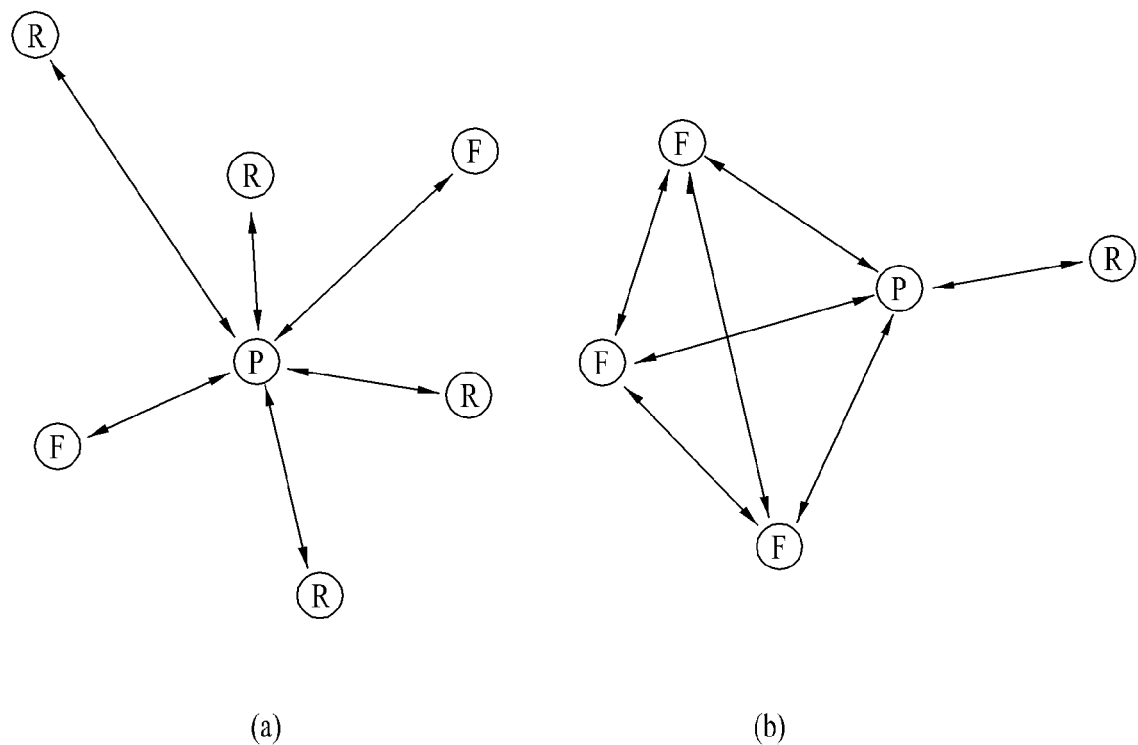
FIG. 1 is a diagram for a network topology according to IEEE 802.15.4 system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP), a coordinator, a personal area network (PAN) coordinator, a medical body area network (MBAN) coordinator, a PAN MBAN coordinator and the like. And, a 'terminal' may be substituted with such a terminology as a user equipment (UE), a mobile station (MS), a mobile subscriber station (MSS), a subscriber station (SS), an advanced mobile station (AMS), a machine-type communication (MTC) device, a machine-to-machine (M2M) device, a device-to-device (D2D) device, a full function device (FFD), a reduced function device (RFD) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.15.4 system, by which the technical idea of the present invention may be non-limited.

1. 3GPP LTE/LTE-A System to which the Present Invention is Applicable 1.1. The General of System FIG. 1 is a diagram for a network topology according to IEEE 802.15.4 system.

Devices of two types, i.e., a full function device (hereinafter abbreviated FFD) and a reduced function device (hereinafter abbreviated RFD) can participate in a network according to IEEE 802.15.4 standard. Hence, a topology of the network according to IEEE 802.15.4 standard can be determined in accordance with the function of the devices participating in the network.

FIG. 1 (a) is an example of a star topology and FIG. 1 (b) is an example of a peer-to-peer topology.

Since the FFD corresponds to a device capable of performing a full function, the FFD can perform a communication with a different FFD or the RFD and may perform such a function as network initialization, node management, node information save, and the like. In particular, among the FFDs, a FFD enabling different devices to configure a network is called a PAN (personal area network) coordinator. The PAN coordinator can be called an MBAN coordinator, a PAN MBAN coordinator, and the like. For clarity, it is commonly called a 'coordinator' in the following description. Hence, the aforementioned network topology can be configured by the FFD performing a role of the coordinator.

Yet, the RFD performs less numbers of functions compared to the functions capable of being performed by the FFD. In particular, a counterpart device with which the RFD can communicate is limited to the FFD. Hence, the RFD cannot perform a coordinator role. Hence, the RFD may have a stack structure of a small size in a manner of shifting complete charge of a network function to the FFD and may save a calculation/memory resource. In particular, the RFD searches for a coordinator and transmits a data. And then, the RFD cuts off connection and enters into a save (sleep) mode. By doing so, amount of power consumption of the RFD may become very low and the RFD may operate long hours with battery power only.

Referring to FIG. 1, a device represented by 'F' indicates a FFD, a device represented by 'R' indicates an RFD, and a device represented by 'P' indicates a FFD performing a coordinator role.

In the star topology depicted in FIG. 1 (a), a communication between a device and a coordinator is performed only. In this case, devices correspond to a start point or an end point of the communication. On the contrary, a coordinator may become a start point, an end point, or a router.

The peer-to-peer topology depicted in FIG. 1 (b), a communication between a device and a coordinator is performed according to at least one hop using middle devices functioning as a relay. In this case, each of the devices can communicate with all different devices in a network. Hence, such a network of a more complex form as a mesh network can be configured. In this case, the coordinator functions as an access point to upper layers. In case of a wireless sensor network (WSN), the coordinator functions as a sink for data collected by sensors.

The star network topology can manage devices in a manner that battery life is maintained for long time and the peer-to-peer network topology has high data reliability and access recognition rate since at least one data delivery path can be configured by the peer-to-peer network topology.

In the star topology, a communication range for each device is very limited (e.g., several meters). The peer-to-peer topology permits a more large area to be covered. Since a topology may be dynamic, the topology varies when devices are added to the topology or leave from the topology.

Hence, the devices have mobility in general. On the contrary, the coordinator may have mobility or may be stationary. The peer-to-peer topology may be more suitable for a rapidly changing environment where a network needs to be quickly set up or changed or self-organization and self-healing of the network is required. For instance, the self-healing may include establishing a new coordinator in case that a legacy coordinator is out of order or has left the network.

A plurality of star and/or peer-to-peer topologies where each of devices has its own coordinator in an identical position can be set. In this case, each of the coordinators can cooperate with each other to avoid interference and permit data sharing and collation. In IEEE 802.15.4 system, this sort of network is called 'cluster' and a provision for establishing an overall coordinator for clusters, dividing the clusters and merging the clusters can be made.

Figure 2:
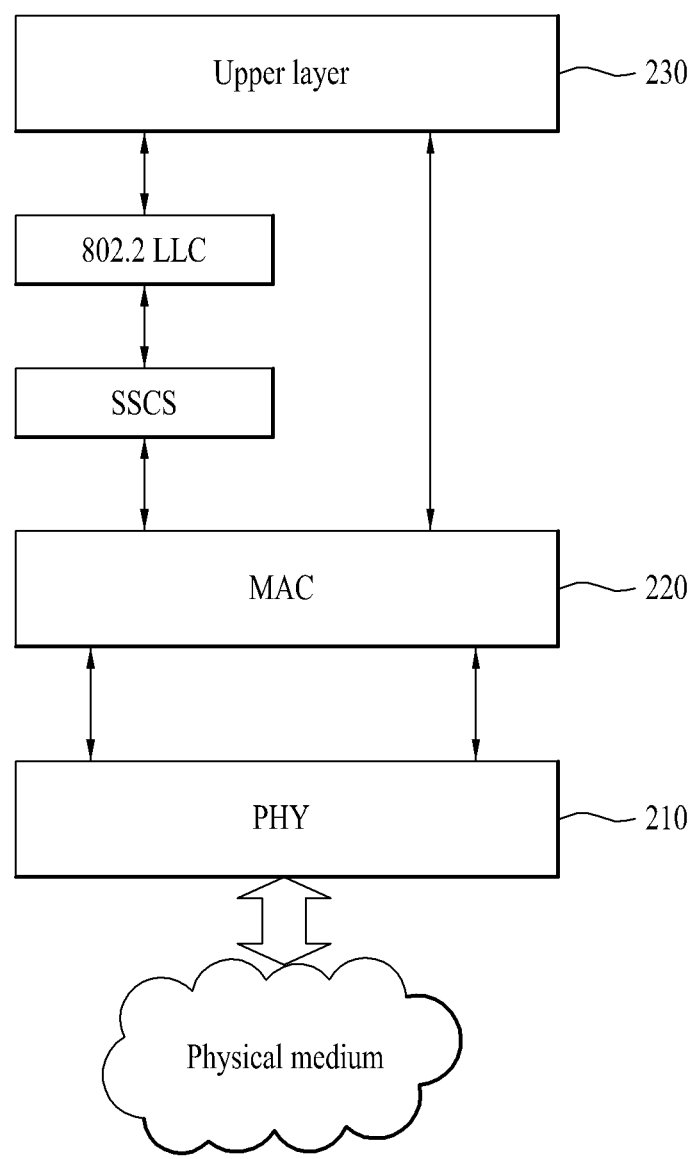
FIG. 2 is a diagram for a protocol stack of IEEE 802.15.4 system.

FIG. 2 is a diagram for a protocol stack of IEEE 802.15.4 system.

Referring to FIG. 2, the protocol stack includes a PHY layer (physical layer), a MAC layer (medium access control layer), and an upper layer.

The PHY layer includes an RF transceiver and a related control mechanism. The PHY layer can provide a PHY data service configured to transmit and receive PHY PDU (protocol data units) on a physical channel and a PHY management service configured to manage the PHY layer.

The MAC layer provides an access for a physical channel configured to transmit a data. The MAC layer can provide a MAC data service configured to transmit and receive MAC PDU (protocol data units) on the physical layer and a MAC management service configured to manage the MAC layer. The MAC layer can perform such a function as beacon management, channel access, GTS (guaranteed time slot) management, frame check, security function, and the like.

The upper layer consists of a network layer and an application layer. The network layer provides such a function as network configuration, processing, message routing, and the like. The application layer provides a function for which a device aims. As an example, IEEE 802.15.4 device may function as an RFD (reduced function device), an FFD (full function device), or a coordinator depending on a type of an installed program, i.e., a type of a program configured to process data of the application layer.

Figure 3:
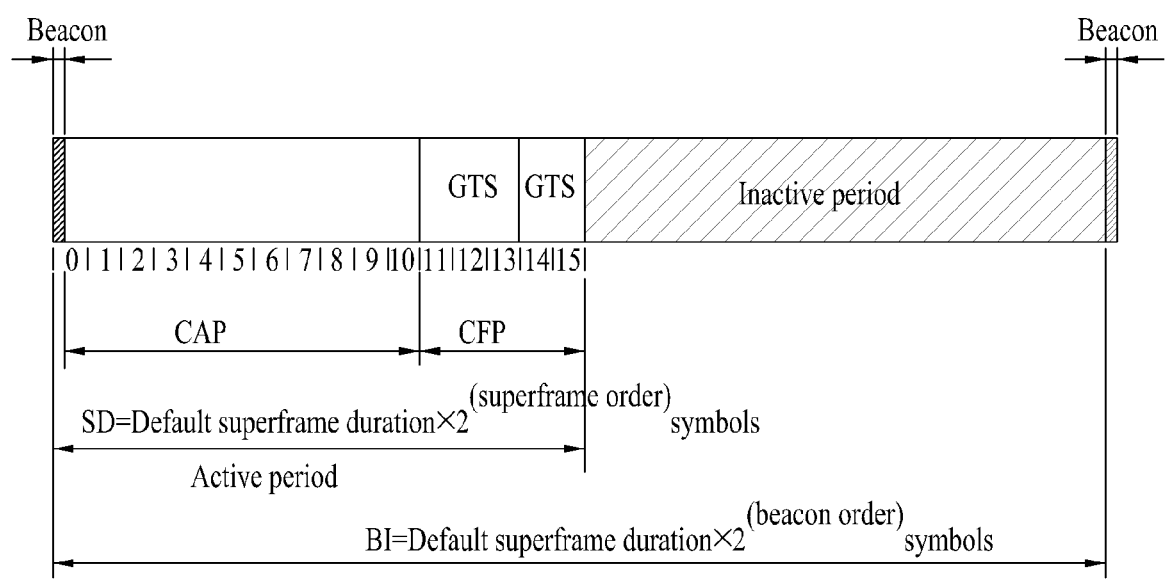
FIG. 3 is a diagram for a superframe structure of IEEE 802.15.4 system.

FIG. 3 is a diagram for a superframe structure of IEEE 802.15.4 system.

IEEE 802.15.4 system can be divided into a beacon enabled network where a network is managed based on a periodically broadcasted beacon and a non beacon-enabled network where a network is managed by non-periodically requesting a beacon for the exchange of a communication frame.

In the beacon-enabled network, a coordinator periodically transmits a beacon and devices periodically listen to the beacon to synchronize with the network and access a channel. As depicted in FIG. 3, a channel access is sequentially transmitted in a frame unit in a superframe according to a superframe structure defined by the coordinator.

A superframe can be configured by a form in which a plurality of time slots (e.g., 16 time slots) for data transmission and reception are included between beacon frames transmitted by a coordinator. Due to a requisite for a low power operation, each superframe can be configured to include an active period and an inactive period between beacon frames. The active period corresponds to a period in which data transmission and reception between devices are performed. The active period consists of time slots for frames used for transmitting and receiving data. On the contrary, the inactive period corresponds to a period in which the data transmission and reception between devices are not performed. In particular, the coordinator can enter a low power mode (or sleep mode) for the inactive period.

A ratio between the active period and the inactive period is called a duty cycle. A duty cycle value can be adjusted in consideration of a requisite for a low power operation and a requisite for coexistence between communication schemes using an identical physical transport channel.

The active period can be configured to include a CAP (contention access period) and a following CFP (contention free period) used for securely accessing applications having a service quality requirement.

The CAP consists of time slots which are used by devices participating in a network to competitively transmit a data frame. Hence, a device, which intends to perform a communication using the time slots belonging to the CAP between two beacon frames, is laid in a competition relation with a different device in terms of using a CSMA-CA (carrier sense multiple access/collision avoidance) scheme.

The CFP consists of GTSs (guaranteed time slots) corresponding to time slots which are allocated to make a specific device transmit a data frame. The GTS can be used for an application where a response speed in a device is fast (low-latency) or an application requiring a specific transmission bandwidth. The CFP is positioned after the CAP in a superframe and may be configured to have maximum 7 GTSs. The CFP may be configured to make a plurality of GTSs to be allocated for a single device.

The coordinator determines a device to which each of the GTSs in the CFP is allocated. Allocation information of the GTS, which is included in the CFP, determined by the coordinator can be transmitted in a manner of being included in a beacon frame corresponding to a first slot of a superframe.

On the contrary, in the non beacon-enabled network, for instance, if a beacon is not requested by such a reason as a purpose of network detection and the like, the coordinator does not transmit the beacon to perform synchronization. Since a channel access is not restricted by a superframe structure and devices are asynchronous, all data transmissions are performed by CSMA-CA. This sort of devices may follow an idle pattern of its own in accordance with such a prescribed protocol as a sensor-MAC (wiseMAC) making devices, which have no data to be transmitted, maintain an idle state for most of time and securing that a receiving device will be activated when data is arrived in a manner that the coordinator puts a wake up preamble at the front of each data frame.

As mentioned in the foregoing description, the coordinator in the beacon-enabled network is in charge of providing synchronization and a channel access to network devices. And, a start and an end of a superframe are defined by the coordinator. The coordinator has 2 main characteristics including performing a potential communication with different networks and supplying sufficient power by an easy replacement of a charged battery for example.

Figure 4:
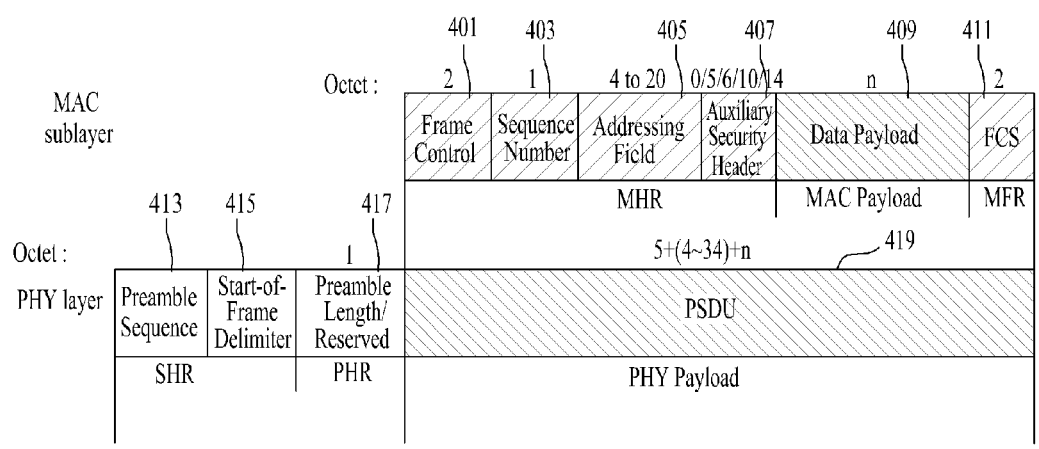
FIG. 4 is a diagram for a frame format of a MAC layer and a frame format of a PHY layer in IEEE 802.15.4 system.

FIG. 4 is a diagram for a frame format of a MAC layer and a frame format of a PHY layer in IEEE 802.15.4 system.

Referring to FIG. 4, a frame format in a MAC layer includes a MAC header (HMR), a MAC payload and a MAC footer (MFR). The MHR, the MAC payload and the MFR form one MAC data frame, i.e., a MAC protocol data unit (MPDU).

The MHR includes a frame control field 401, a sequence number field 403, an address field 405 and an auxiliary security header field 407.

Among the fields of the MHR, the frame control field 401 includes a value indicating a type (or kind) of a frame format, the sequence number field 403 includes a current value of macDSN and the address field 405 may include a reception and/or transmission address. And, the auxiliary security header field 407 may include information necessary for processing security of a frame.

Although it is not depicted, the MAC payload can be configured to include a command frame identifier and a command payload. And, the MFR can be configured to include a frame check sequence (FCS) 411. The FCS 411 can be used to determine whether there is an error of data transmission for a MAC payload part.

In IEEE 802.15.4 network, 4 different types of frames, i.e., a beacon frame used by the coordinator, a data frame used for transmitting data, a check response frame used for checking a successful frame reception and a MAC command frame used for controlling all MAC peer entity control transmissions such as a data request, are accompanied to transmit a beacon. In this case, each of the beacon frame, the check response frame and the MAC command frame has a similar structure except a point that the MAC payload has a different function in each case and the check response frame does not have the MAC payload. And, each of the beacon frame, the check response frame and the MAC command frame can originate in a MAC sublayer without an involvement of upper layers.

Meanwhile, the MPDU is transmitted to a PHY layer as a PHY service data unit (PSDU) and the PSDU becomes a PHY payload in the PHY layer. A synchronization header (SHR) including a preamble sequence 413 and a start-of-frame delimiter (SFD) 415 and a PHY header (PHR) including a frame length/reservation 417, which indicates a length of the PHY payload in octet unit, are positioned at the front of the PHY payload. The preamble sequence 413 and the data SFD 415 enable a receiver to achieve symbol synchronization. The aforementioned SHR, the PHR and the PHY payload form a PHY packet, i.e., a PHY protocol data unit (PPDU).

1.2. GTS Allocation/De-Allocation

For data transmission and reception between a specific device and a coordinator via exclusive band allocation in a WPAN system, a prescribed transmission band should be allocated. A GTS (guaranteed time slot) is defined in IEEE 802.15.4 as the prescribed transmission band. In the following, for clarity, assume that allocation of a transmission band corresponds to allocation of the GTS according to IEEE 802.15.4.

Figure 5:
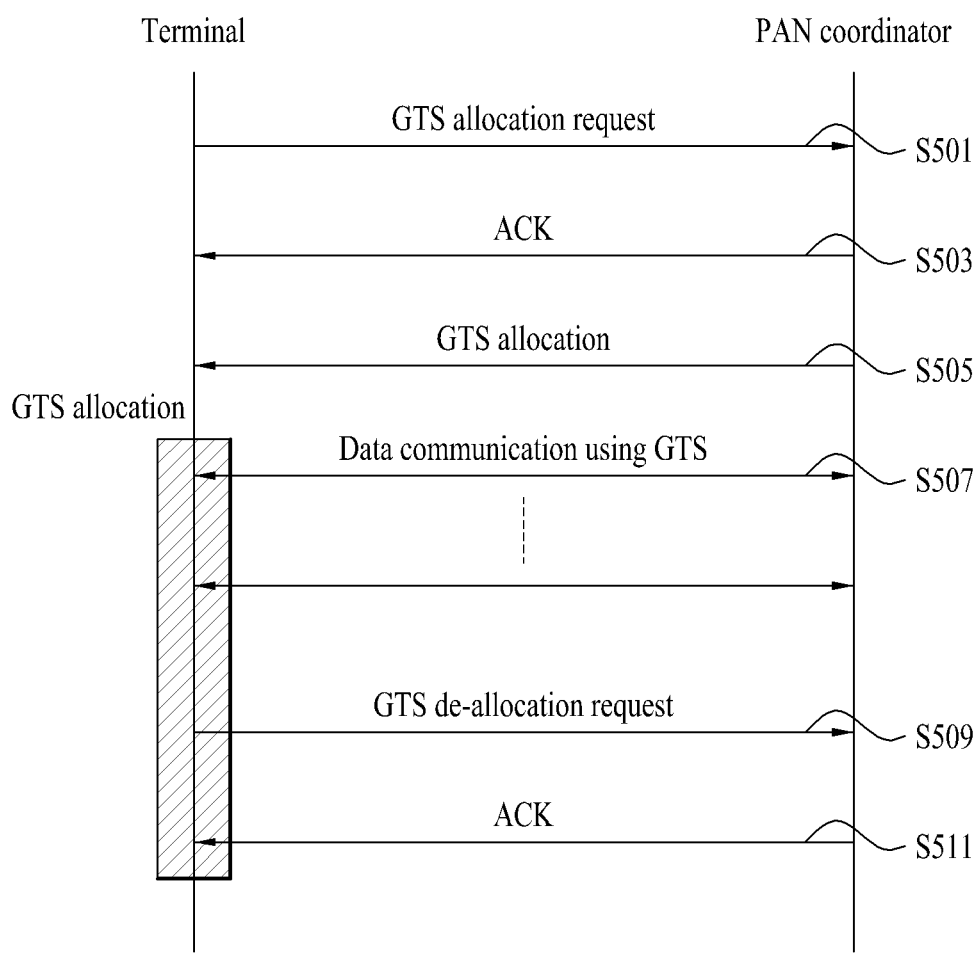
FIG. 5 is a flowchart for a procedure of allocating a GTS and a procedure of de-allocating a GTS in IEEE 802.15.4 system.

FIG. 5 is a flowchart for a procedure of allocating a GTS and a procedure of de-allocating a GTS in IEEE 802.15.4 system.

Referring to FIG. 5, in case that a device has data to be transmitted to a PAN coordinator, the device requests GTS allocation in a manner of transmitting a GTS allocation request command including a parameter for a necessary GTS to the PAN coordinator [S501]. In this case, the GTS allocation request can be indicated by setting a characteristics type of a GTS characteristics field included in the GTS allocation request command to 1.

Having determined on whether the GTS is allocated to the device, if it is determined to allocate the GTS to the device, the PAN coordinator transmits ACK (acknowledgment) to the device [S503]. Subsequently, the PAN coordinator transmits a beacon including information (GTS descriptor) on the allocated GTS to the device [S505] and enables the device, which has received the beacon, to use the GTS according to the information included the beacon.

The device transceives data with the PAN coordinator using the allocated GTS.

If it is not necessary to use the GTS anymore, the device transmits a GTS request command for GTS de-allocation to the PAN coordinator [S509]. In this case, the GTS de-allocation request can be indicated by setting a characteristics type of a GTS characteristics field included in the GTS de-allocation request command to 0. Having received the GTS de-allocation request from the device 100, the PAN coordinator de-allocates the GTS allocated to the device 100 and transmits ACK to the device 100 [S511].

Figure 6:
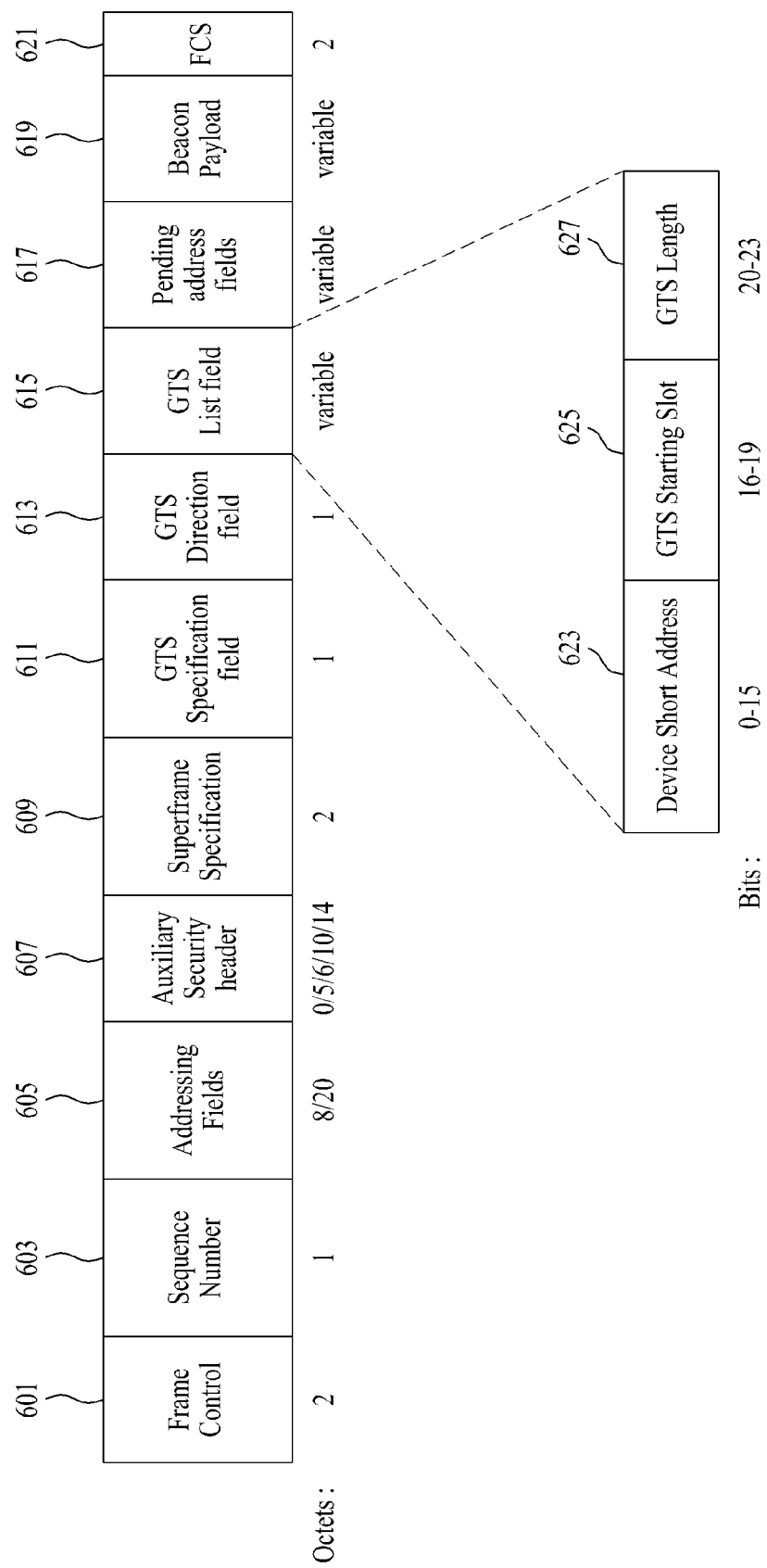
FIG. 6 is a diagram for an example of a beacon frame structure and a GTS descriptor structure of IEEE 802.15.4 system.

FIG. 6 is a diagram for an example of a beacon frame structure and a GTS descriptor structure of IEEE 802.15.4 system.

Referring to FIG. 6, content of each field included in a beacon frame follows content defined by IEEE.802.15.4. The beacon frame includes a MHR, a MAC payload and a MFR. The MHR includes a frame control field 601, sequence number field 603, an address field 605 and an auxiliary security header 607. The MAC payload of the beacon frame can include a superframe specification field 609, a GTS specification field 611, a GTS direction field 613, a GTS list field 615, a pending address field 617 and a beacon payload field 619. The MFR can be configured to include a frame check sequence (FCS) 621.

In particular, content of allocation on each GTS is configured in a form of a GTS descriptor by the PAN coordinator. The GTS descriptors are included in a GTS list field of a beacon. In particular, the GTS list field 615 can include a device short address subfield 623, a GTS starting slot subfield 625 and a GTS length subfield 627. In this case, the device short address subfield 623 indicates a short address of 16-bit long of a device indicated by the GTS descriptor. The GTS starting slot subfield 625 of 4-bit long indicates a slot number where a corresponding GTS starts. The GTS length subfield 627 of 4-bit long indicates the number of slots included in the corresponding GTS.

Although it is not depicted, the superframe specification field 609 can include information on a beacon order, a superframe order, a last CAP slot, a CAP, a CFP, a length of an active period, a battery life, whether it is transmitted from the PAN coordinator, and the like. Yet, this is just an example. The information included in the superframe specification field 609 can be modified.

The GTS specification field 611 can include a GTS descriptor count subfield. The GTS descriptor count subfield indicates the number of the aforementioned GTS descriptors to be included in the GTS list field 615. For instance, if a size of the GTS descriptor count subfield corresponds to 3 bits, the GTS list field 615 can include maximum 7 GTS descriptors.

The GTS direction field 613 can include a GTS direction mask subfield indicating directions of GTSs within a subframe. In particular, the GTS direction mask subfield can indicate whether each of the GTSs included in the GTS list field 615 is for data transmit-only or data receive-only.

Figure 7:
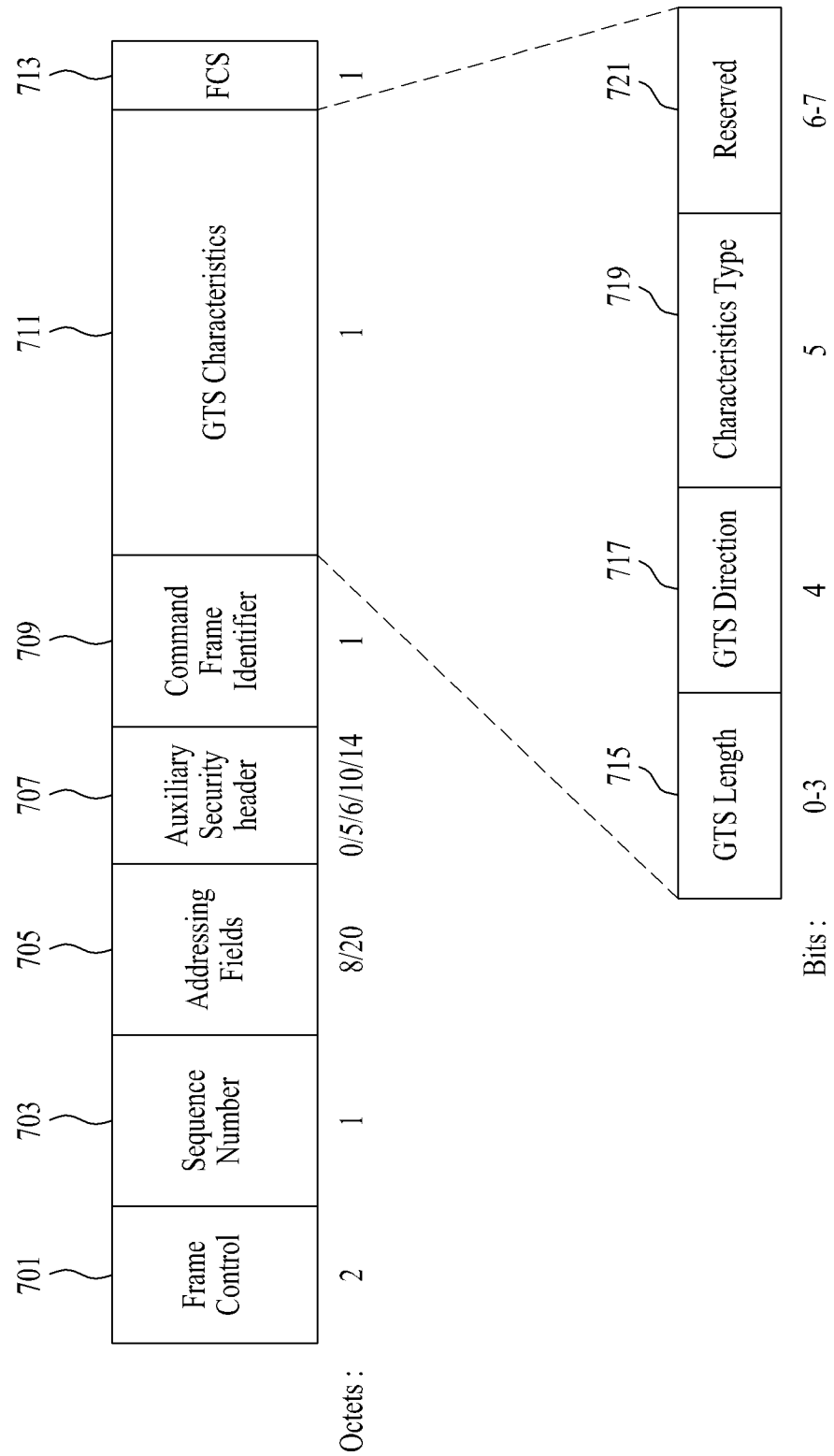
FIG. 7 is a diagram for an example of a GTS request command structure of IEEE 802.15.4 system.

FIG. 7 is a diagram for an example of a GTS request command structure of IEEE 802.15.4 system.

Referring to FIG. 7, content of each field included in a beacon frame follows contents defined by IEEE.802.15.4. A GTS request command can be configured to include a frame control field 701, sequence number field 703, an address field 705, an auxiliary security header field 707, a command frame identifier field 709, a GTS characteristics field 711 and a frame check sequence (FCS) 713.

In particular, the GTS characteristics field 711 within the GTS request command delivers a nature and character of a GTS requested by a device to a PAN coordinator.

The GTS characteristics field 711 includes a GTS length subfield 715, a GTS direction subfield 717, a characteristics type subfield 719 and reserved subfield 721. The GTS length subfield 715 indicates how many superframe slots are necessary to configure a corresponding GTS. The GTS direction subfield 717 indicates whether the corresponding GTS is used for the purpose of receiving or transmitting by the device. The characteristics type subfield 719 indicates whether the GTS request command is used for GTS allocation or GTS de-allocation.

1.3. GTS Expiration

A GTS expiration operation in IEEE 802.15.4 system is defined as follows.

When a device transmits a transmit GTS to a PAN coordinator, if the PAN coordinator does not receive data from the device for (2×n) superframes via a GTS allocated to the device, the PAN coordinator de-allocates the GTS allocated to the device in a manner of making the GTS to be expired.

On the contrary, when the PAN coordinator transmits a receive GTS to the device, if the PAN coordinator does not receive an ACK (acknowledgement) frame from the device for (2×n) superframes after transmitting data to the device using the corresponding GTS, the PAN coordinator makes the receive GTS to be expired. Yet, the data transmitted to the device by the PAN coordinator corresponds to data which is not necessary to transit the ACK frame, the PAN coordinator can make the GTS to be expired at any time without any restriction.

In this case, a value of n in the aforementioned scheme can be defined by a Formula 1 in the following.

$$n=2^{(8-macBeaconOrder)} \text{ (where } 0 \leq macBeaconOrder \leq 8)$$

$$n=1 \text{ (where } 9 \leq macBeaconOrder \leq 14) \quad \text{[Formula 1]}$$

In this case, a value of 'macBeaconOrder' indicates how often the PAN coordinator transmits a beacon to the device in IEEE 802.15.4 system. In particular, the value indicates a transmission period of the beacon. As the value becomes greater, the PAN coordinator transmits the beacon to the device with a longer period. Yet, when the value of 'macBeaconOrder' corresponds to 15, the PAN coordinator does not periodically transmit the beacon.

And, in case of performing GTS de-allocation due to such a reason as a GTS de-allocation request of an upper layer including GTS expiration, maintenance, and the like, a legacy IEEE 802.1.5.4 standard defines that a beacon is transmitted in a manner of including a GTS descriptor indicating that a specific GTS de-allocation is achieved until a back of superframes as much as 'aGTSDescPersistenceTime' parameter value.

2. Persistent Scheduling

As mentioned in the foregoing description, according to the GTS allocation scheme of IEEE 802.15.4, if a GTS is allocated to a device by a PAN coordinator, the GTS is continuously allocated to the device in every superframe until the GTS is de-allocated by a request of the device or GTS expiration. Yet, this sort of scheme may be inefficient since a required GTS may vary according to each device. This is because once a GTS is allocated to a specific device, the GTS cannot be used by different devices until the allocated GTS is de-allocated.

Hence, it is necessary to have a method of allocating a GTS with a different period according to a device and enabling a plurality of devices to use a single GTS using a time division scheme. To this end, the present invention proposes a method of persistently or periodically allocating a radio resource via a GTS in IEEE 802.15.4 WPAN in the following. For clarity, such a terminology as 'persistent' and 'periodic' is used as a same meaning in the present invention.

Figure 8:
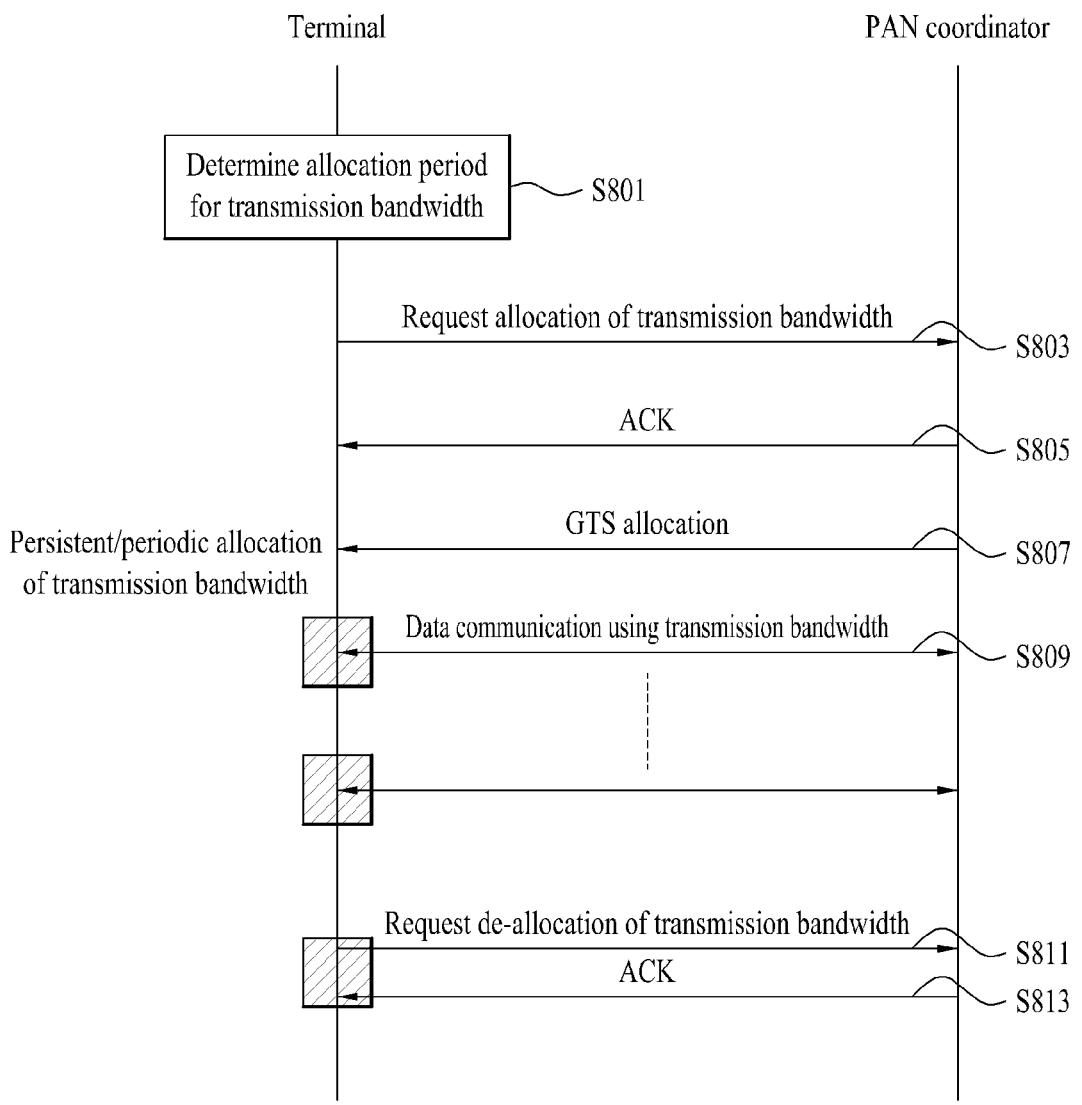
FIG. 8 is a flowchart for an example of a method of allocating a transmission band according to one embodiment of the present invention.

FIG. 8 is a flowchart for an example of a method of allocating a transmission band according to one embodiment of the present invention.

When a device has data to be transmitted to a PAN coordinator, the device may request allocation of a transmission band necessary for transmitting and receiving the data. In this case, an example of the transmission band may correspond to a GTS (guaranteed time slot).

When the device makes a request for the allocation of the transmission band to the PAN coordinator, the device can determine an allocation period (or interval) of the transmission band based on characteristic information owned by the device [S801]. In this case, the characteristic information may correspond to information obtained from the data to be transmitted or information obtained from characteristic of the device itself. For instance, the characteristic information may include the total amount of data to be transmitted, whether the data is periodically transmitted, a usage of the device, and the like. In this case, when the device determines the allocation period of the transmission band, the device may determines the allocation period in a superframe unit or a prescribed time unit. In particular, the device can determine the allocation period such as 'transmission band of one time per 3 superframes' or 'transmission band of one time per 20 ms' based on the characteristic information.

Subsequently, the device can transmit a transmission band request including the allocation period of the determined transmission band to the PAN coordinator [S803]. For instance, in case of requesting a GTS allocation, the device can transmit a GTS request command to the PAN coordinator. In this case, a value of a characteristics type subfield of a GTS characteristics field included in the GTS request command is set to 1 to indicate that it means the GTS allocation request. In this case, the GTS request command and the GTS characteristic field can be called a periodic GTS request command and a periodic GTS characteristics field, respectively. For clarity, the periodic GTS request command and the periodic GTS characteristics field are commonly called the GTS request command and the GTS characteristic field, respectively.

The transmission band request may include preferred time (or superframe) of the GTS allocation, information on a required transmission band, the allocation period determined by the device, and the like. In this case, the transmission band request may correspond to a GTS request command frame defined by IEEE 802.15.4. And, the allocation period of the transmission band can be included in the GTS characteristics field within the GTS request command frame. Moreover, the GTS characteristics field may further include a GTS period (or interval) field and the GTS period field may indicate the allocation period of the transmission band determined by the device.

Having received the transmission band request from the device, the PAN coordinator transmits an ACK (acknowledgement) to the device to inform the device of a grant of the transmission band allocation [S805]. Or, if there is no transmission band to allocate to the device, the PAN coordinator may transmit a notification notifying that it is not able to allocate a transmission band. In case of allocating a transmission band to the device, the PAN coordinator can allocate the transmission band based on the allocation period included in the received transmission band request. In this case, the PAN coordinator can allocate the transmission band according to the request of the device as it is or may allocate the transmission band different from the request of the device in consideration of a resource status, a communication status with a different device, and the like. For instance, despite the device has requested 'transmission band of one time per 2 superframes', if allocable transmission bands are insufficient, the PAN coordinator can allocate 'transmission band of one time per 4 superframes'.

The PAN coordinator can transmit allocation information of the transmission band to the device [S807]. The allocation information of the transmission band may correspond to an allocation period of a transmission band determined by the PAN coordinator, a start point and an end point of the transmission band, or the like.

The PAN coordinator can transmit the allocation information of the transmission band to the device in a manner of including a subfield for a persistent scheduling in a GTS descriptor of a beacon frame defined by IEEE 802.15.4. In this case, the allocation information of the transmission band can be included in a GTS list field within the beacon frame. The GTS list field may further include a start sequence number field and a GTS period field. The start sequence number field indicates a sequence number of a superframe in which allocation of the transmission band starts and the GTS period field indicates a period of the transmission band allocated to the device.

The device can transmit and receive data via the transmission band allocated by the PAN coordinator [S809]. For instance, having received the persistent scheduling information on the GTS, which is allocated via the GTS descriptor of the beacon frame, the device can periodically transceive data with the PAN coordinator using the GTS, which is allocated with a specific period from a start superframe described in the GTS descriptor.

If the data transmission and reception are completed, the device can transmit a transmission band de-allocation request [S811]. In this case, a value of the characteristics type subfield of the GTS characteristics field included in the GTS request command is set to 0 to indicate that it means the GTS allocation request.

Subsequently, having received the de-allocation request, the coordinator transmits an ACK [S813] and stops allocating the transmission band.

Meanwhile, the transmission band request in the step S803 may correspond to a request of allocating a transmission band in a CFP (contention free period). In this case, if the transmission band is allocated in the CFP, data is transmitted and received via the aforementioned process. If the transmission band is not allocated in the CFP, the device transmits the data in a CAP (contention access period).

In the following, a structure of a GTS request command frame and a beacon frame transceived between the device and the PAN coordinator is explained.

2.1. GTS Request Command & Beacon Frame—1

Figure 9:
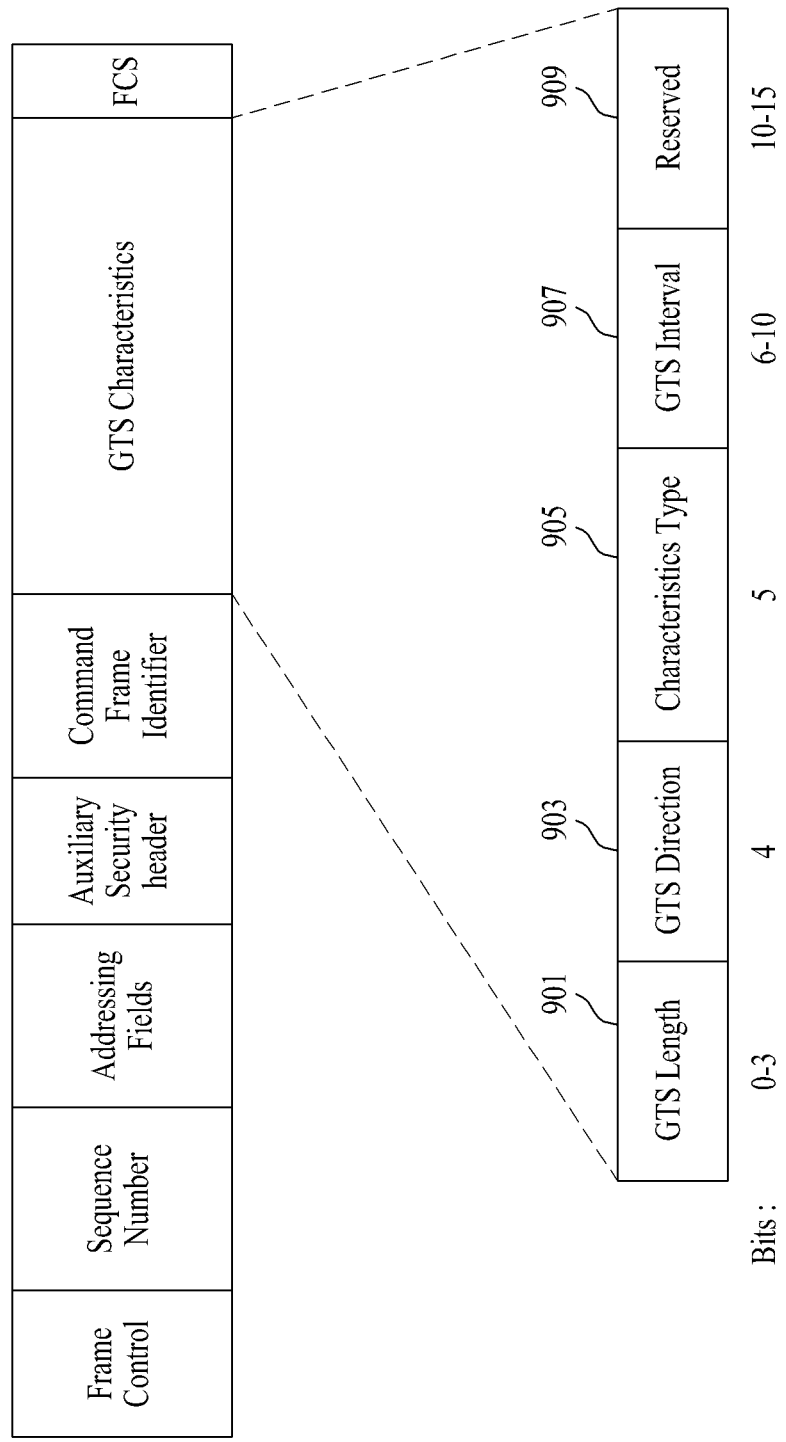
FIG. 9 is a diagram for a GTS request command structure according to one embodiment of the present invention.

FIG. 9 is a diagram for a GTS request command structure according to one embodiment of the present invention. In FIG. 9, the number of bits of each field/subfield is just an example. It is apparent that each field/subfield can be configured with the number of bits different from the number of bits depicted in FIG. 9.

Referring to FIG. 9, the GTS request command may further include a GTS interval/period subfield 907 as well as the GTS characteristics field defined by IEEE 802.15.4. In particular, the GTS interval/period subfield 907 can be further added to the GTS request command as well as a GTS length subfield 901, a GTS direction subfield 903, a characteristics type subfield 907 and a reserved subfield 909 included in the GTS characteristics field.

The GTS length subfield 901 indicates the number of superframe slots requested for a periodic GTS.

The GTS direction subfield 903 indicates whether the periodic GTS is used for the purpose of receiving or transmitting by the device. For instance, if the periodic GTS corresponds to a receive-only periodic GTS, the GTS direction subfield is set to 1. On the contrary, if the periodic GTS corresponds to a transmit-only periodic GTS, the GTS direction subfield is set to 0.

The characteristics type subfield 905 indicates whether the GTS request command is used for allocating the periodic GTS or de-allocating the periodic GTS. For instance, if the GTS request command is used for allocating the periodic GTS, the characteristics type subfield is set to 1. If the GTS request command is used for de-allocating the periodic GTS, the characteristics type subfield is set to 0.

The GTS period subfield 907 indicates an allocation period of the periodic GTS determined by the device. In particular, the device determines the allocation period of the periodic GTS in a manner of estimating (or calculating) a size of a superframe of the PAN currently accessed by the device or data transmission traffic and a period required by the device and may be then able to make a request for allocation of the periodic GTS to the PAN coordinator via the GTS period subfield 907.

In this case, the device may designate the allocation period of the periodic GTS in a superframe unit. For instance, the device can configure a value of the GTS period subfield 907 to make a request for GTS allocation allocated one time per every 2 superframes. And, the device can configure the allocation period of the periodic GTS in a time unit. For instance, the device can configure the value of the GTS period subfield 907 to make a request for GTS allocation allocated one time in every 10 ms. As mentioned earlier, the value of the GTS period subfield 907 may directly indicate the allocation period of the periodic GTS.

And, the value of the GTS period subfield 907 can be used for a value for defining the allocation period of the periodic GTS. In this case, the allocation period of the periodic GTS can be determined using a prescribed constant and the value of the GTS period subfield 907. For instance, the GTS allocation period can be determined by exponentiating the value of the GTS period subfield 907. In particular, an exponent multiple value ($2^{value\ of\ GTS\ period\ subfield}$ or $2^{value\ of\ GTS\ period\ subfield+1}$) of the value of the GTS period subfield 907 for a specific constant may become the GTS allocation period. Or, a value (constant×value of the GTS period subfield) where the value of the GTS period subfield 907 multiplied by a specific constant may become the GTS allocation period. In this case, the PAN coordinator and the device may be aware of information on the constant in advance. The PAN coordinator may transmit the information to the device.

Figure 10:
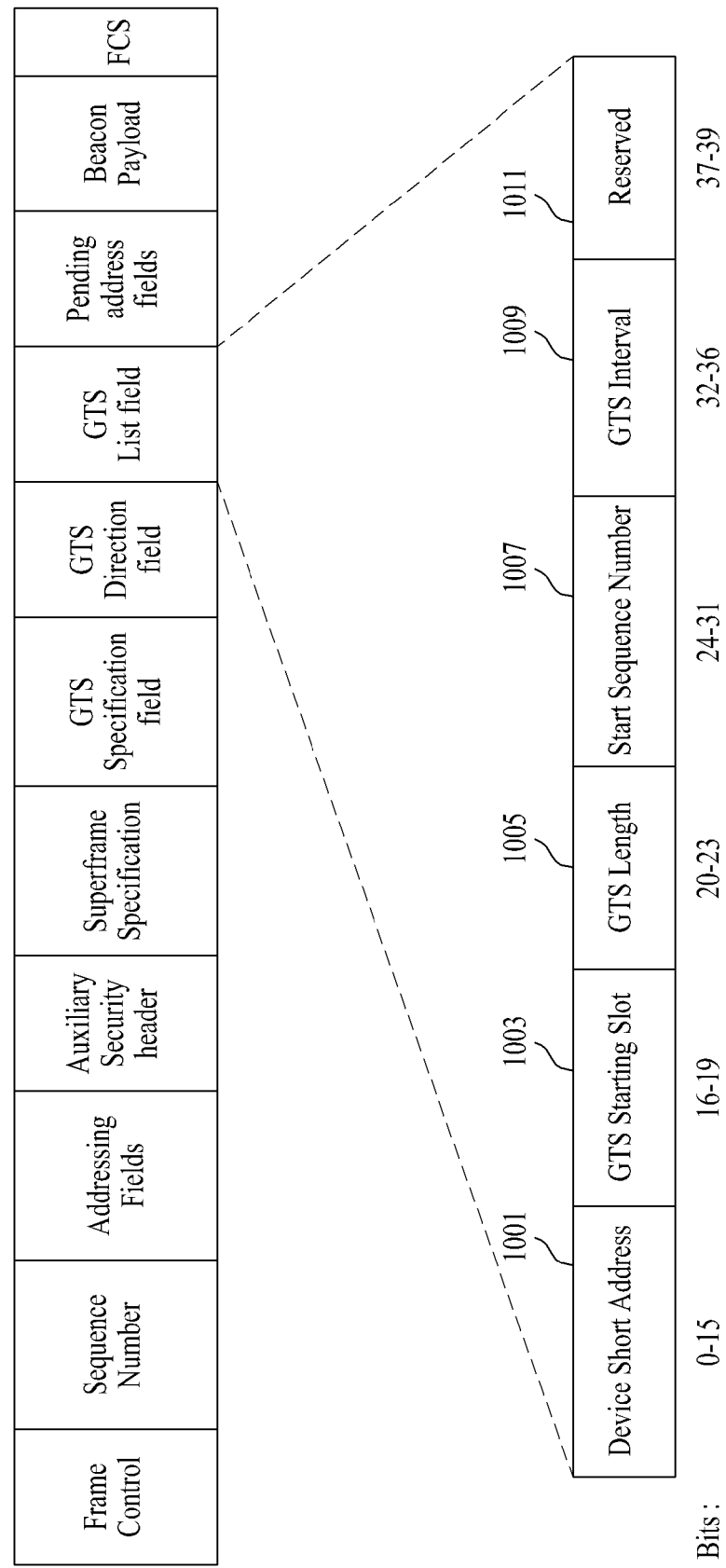
FIG. 10 is a diagram for a beacon frame structure according to one embodiment of the present invention.

FIG. 10 is a diagram for a beacon frame structure according to one embodiment of the present invention. In FIG. 10, the number of bits of each field/subfield is just an example. It is apparent that each field/subfield can be configured with the number of bits different from the number of bits depicted in FIG. 10.

Referring to FIG. 10, a beacon frame according to one embodiment of the present invention may further include a start sequence number subfield 1007 and a GTS interval/period subfield 1009 within a GTS list field defined by IEEE 802.15.4.

In particular, besides a device short address subfield 623, a GTS starting slot subfield 625 and a GTS length subfield 627, included in the GTS list field, the start sequence number subfield 1007 and the GTS interval/period subfield 1009 can be further added. And, a reserved subfield 1011 may be further added as well.

The start sequence number subfield 1007 indicates a sequence number of a superframe in which allocation of a periodic GTS allocated to the device starts. In this case, the sequence number indicates an order of a superframe carrying a beacon, which is included in every beacon frame.

The GTS period subfield 1009 indicates a period of the periodic GTS allocated to the device. A value of the GTS period subfield 1009 is a value determined by the PAN coordinator in consideration of a GTS period value, which is requested by the device to the PAN coordinator via the GTS request command frame shown in FIG. 9. In this case, the GTS period subfield value may become greater or less than the value requested by the device depending on a resource allocation policy of the PAN coordinator or a status of current GTS allocation. A scheme of designating an allocation period of the periodic GTS allocated to the device in a beacon frame can use a scheme identical to a scheme of indicating the allocation period of the periodic GTS in a GTS request command.

2.2. GTS Request Command & Beacon Frame—2

Figure 11:
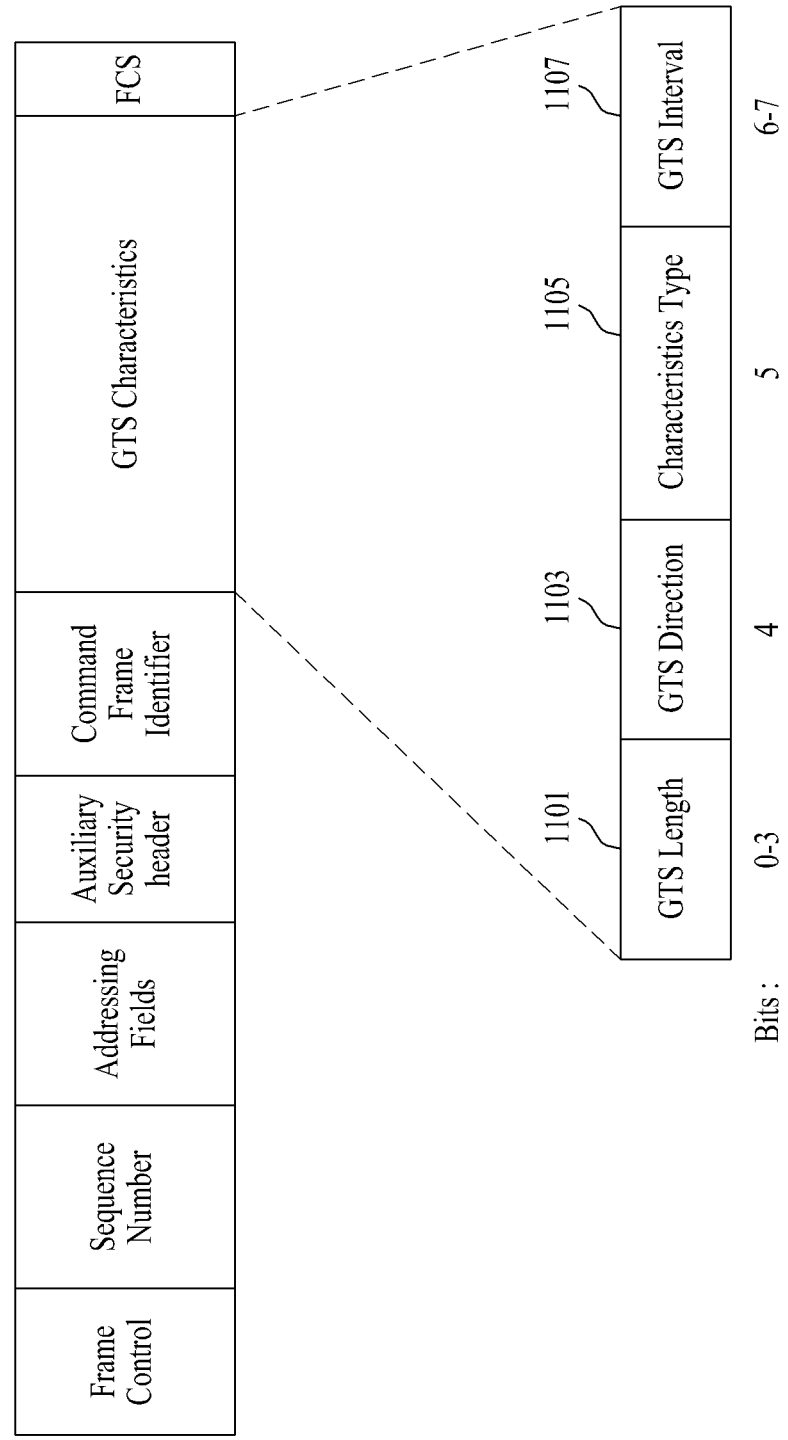
FIG. 11 is a diagram for a GTS request command structure according to one embodiment of the present invention.

FIG. 11 is a diagram for a GTS request command structure according to one embodiment of the present invention. In FIG. 11, the number of bits of each field/subfield is just an example. It is apparent that each field/subfield can be configured with the number of bits different from the number of bits depicted in FIG. 11. For clarity, explanation on content identical to FIG. 9 is omitted at this time.

Referring to FIG. 11, in order to configure a GTS period subfield with the number of bits identical to the number of bits of a GTS characteristics field of a legacy IEEE 802.15.4, the GTS period subfield 1107 can be configured by 2-bit long. If a longer period cannot be indicated by 2 bits only, a value of the GTS period subfield 907 can be used for a value for defining allocation period of the periodic GTS. In this case, the allocation period of the periodic GTS can be determined using a prescribed constant and the value of the GTS period subfield 1107. For instance, the GTS allocation period can be determined by exponentiating the value of the GTS period subfield 1107. In particular, an exponent multiple value ($2^{value\ of\ GTS\ period\ subfield}$ or $2^{value\ of\ GTS\ period\ subfield+1}$) of the value of the GTS period subfield 1107 for a specific constant may become the GTS allocation period. Or, a value (constant×value of the GTS period subfield) where the value of the GTS period subfield 1107 multiplied by a specific constant may become the GTS allocation period. In this case, the PAN coordinator and the device may be aware of information on the constant in advance. The PAN coordinator may transmit the information to the device.

Figure 12:
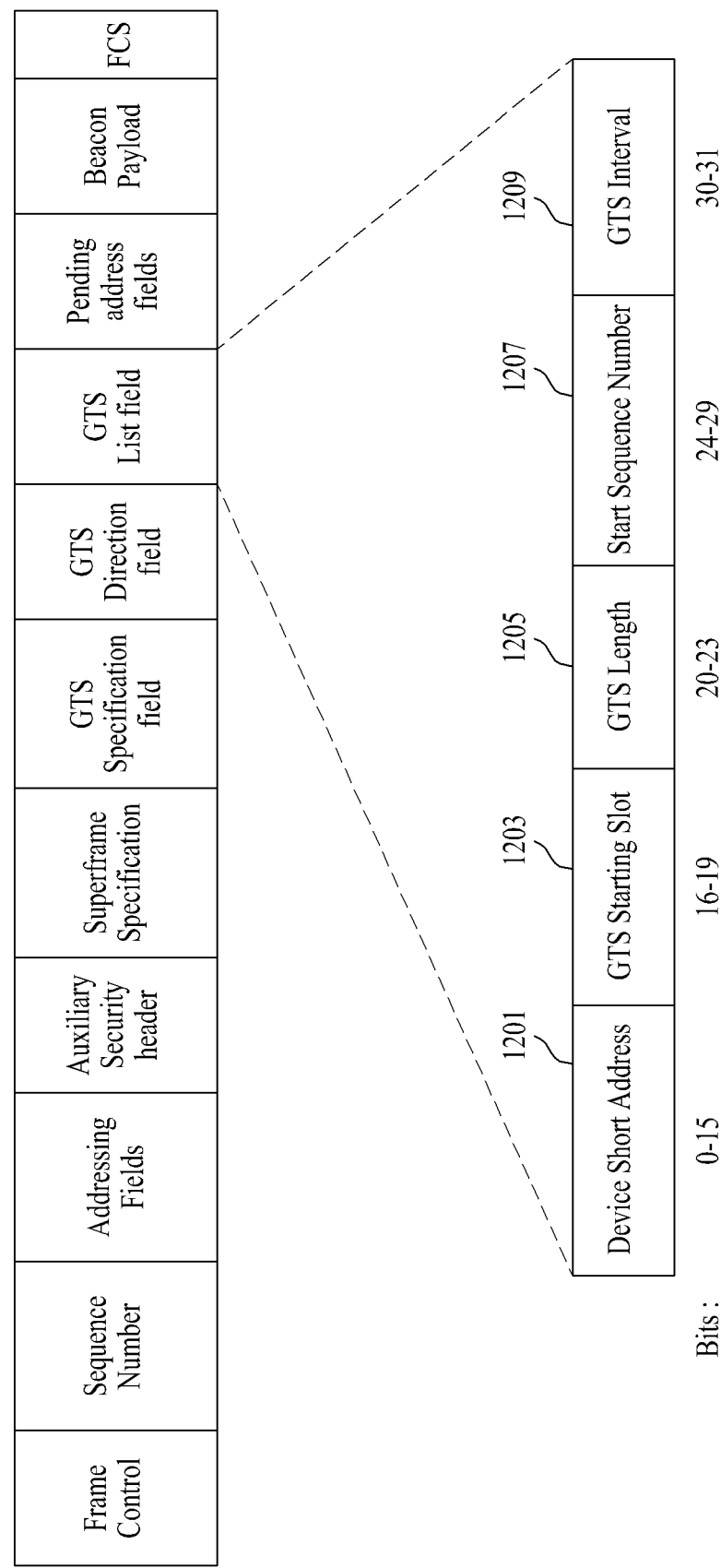
FIG. 12 is a diagram for a beacon frame structure according to one embodiment of the present invention.

FIG. 12 is a diagram for a beacon frame structure according to one embodiment of the present invention. In FIG. 12, the number of bits of each field/subfield is just an example. It is apparent that each field/subfield can be configured with the number of bits different from the number of bits depicted in FIG. 12. For clarity, explanation on content identical to FIG. 10 is omitted at this time.

Referring to FIG. 12, in order to reduce overhead of a beacon frame, a start sequence number subfield 1207 and a GTS interval subfield 1209 can be configured by 6-bit long and 2-bit long, respectively.

The start sequence number subfield 1207 indicates a sequence number of a superframe in which allocation of a periodic GTS allocated to the device starts. In this case, the sequence number indicates an order of a superframe carrying a beacon, which is included in every beacon frame. Yet, if the start sequence number subfield 1207 is configured with 6 bits, it may be different from the number of bits (8 bits) of a sequence number of a legacy beacon frame in size. Hence, if the start sequence number subfield 1207 configured with 6 bits, the superframe in which the periodic GTS allocation starts can be indicated by using a bottom (or low) 6 bits of the sequence number of the beacon frame. In particular, the PAN coordinator may designate a frame in which allocation of the periodic GTS allocated to the device starts in a manner of checking whether a value of the start sequence number field is identical to the bottom (or low) 6 bits of the sequence number of the beacon frame.

The GTS period subfield 1209 indicates a period of the periodic GTS allocated to the device. A value of the GTS period subfield 1209 is a value determined by the PAN coordinator in consideration of a GTS period value, which is requested by the device to the PAN coordinator via the GTS request command frame shown in FIG. 11. If a longer period cannot be indicated by 2 bits of the GTS period subfield 1209 only, a value of the GTS period subfield 1209 can be used for a value for defining allocation period of the periodic GTS. In this case, the allocation period of the periodic GTS can be determined using a prescribed constant and the value of the GTS period subfield 1209. For instance, the GTS allocation period can be determined by exponentiating the value of the GTS period subfield 1209. In particular, an exponent multiple value ($2^{value\ of\ GTS\ period\ subfield}$ or $2^{value\ of\ GTS\ period\ subfield+1}$) of the value of the GTS period subfield 1209 for a specific constant may become the GTS allocation period. Or, a value (constant×value of the GTS period subfield) where the value of the GTS period subfield 1209 multiplied by a specific constant may become the GTS allocation period. In this case, the PAN coordinator and the device may be aware of information on the constant in advance. The PAN coordinator may transmit the information to the device.

2.3. GTS Request Command & Beacon Frame—3

Figure 13:
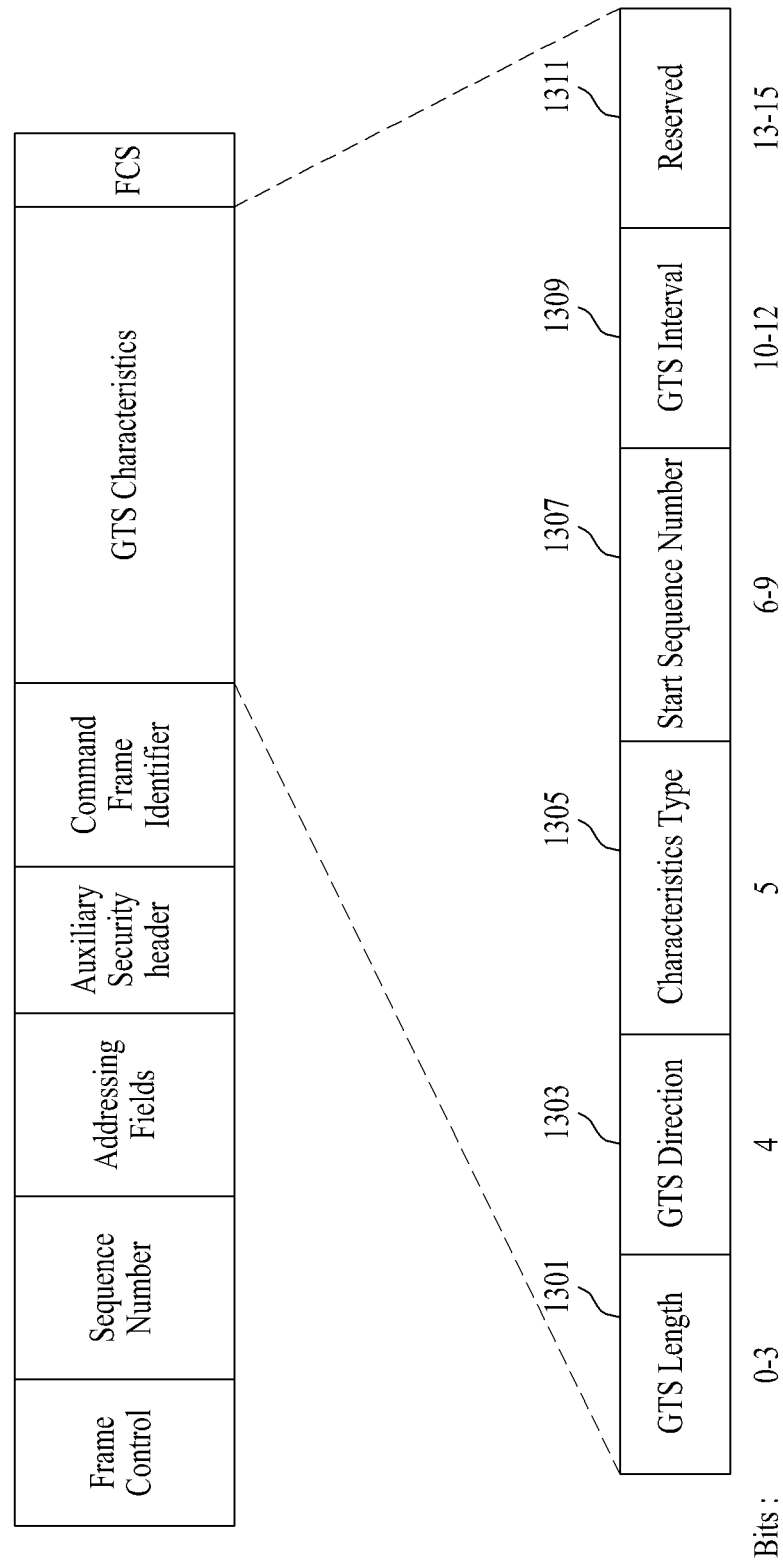
FIG. 13 is a diagram for a GTS request command structure according to one embodiment of the present invention.

FIG. 13 is a diagram for a GTS request command structure according to one embodiment of the present invention. In FIG. 13, the number of bits of each field/subfield is just an example. It is apparent that each field/subfield can be configured with the number of bits different from the number of bits depicted in FIG. 13. For clarity, explanation on content identical to FIG. 9 is omitted at this time.

Referring to FIG. 13, it is able to further include a start sequence number subfield 1307 and a GTS interval subfield 1309 within a GTS characteristics field of a legacy IEEE 820.15.4. By doing so, a size of the GTS characteristics field may be changed. As an example of the change, 1 octet/byte may be added to the field.

The start sequence number subfield 1307 indicates a sequence number of a superframe in which allocation of the periodic GTS allocated to the device starts. In this case, a value of the start sequence number subfield 1307 can be designated by a relative value indicating a superframe appearing after the number of superframes as many as a value of the GTS start sequence number designated from the current superframe. In particular, the value of the GTS start sequence number subfield 1307 can be indicated by a difference value (the number of superframes) between the current superframe and a first superframe of the periodic GTS requested by the device. For instance, a superframe appearing after (GTS start sequence number subfield value+1) from the current superframe may become the first superframe of the periodic GTS.

The GTS period field 1309 indicates a period of the GTS allocated to the device. In this case, as mentioned earlier in FIG. 9, the GTS period subfield can be used as a value for defining the GTS allocation period. In this case, the allocation period of the periodic GTS can be determined using a prescribed constant and the value of the GTS period subfield 1309. For instance, the GTS allocation period can be determined by exponentiating the value of the GTS period subfield 1309. In particular, an exponent multiple value ($2^{value\ of\ GTS\ period\ subfield}$ or $2^{value\ of\ GTS\ period\ subfield+1}$) of the value of the GTS period subfield 1309 for a specific constant may become the GTS allocation period. Or, a value (constant×value of the GTS period subfield) where the value of the GTS period subfield 1309 multiplied by a specific constant may become the GTS allocation period. In this case, the PAN coordinator and the device may be aware of information on the constant in advance. The PAN coordinator may transmit the information to the device.

Figure 14:
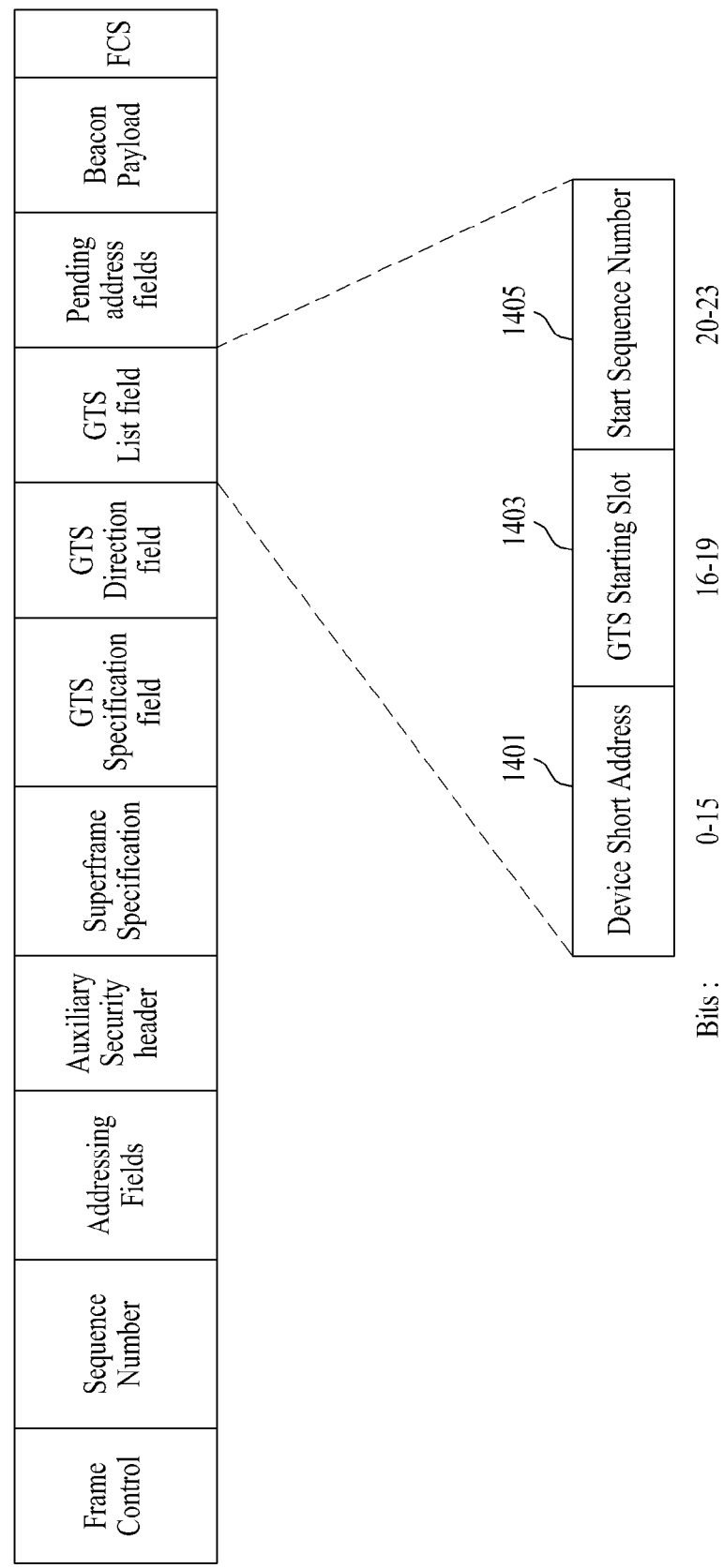
FIG. 14 is a diagram for a beacon frame structure according to one embodiment of the present invention.

FIG. 14 is a diagram for a beacon frame structure according to one embodiment of the present invention. In FIG. 14, the number of bits of each field/subfield is just an example. It is apparent that each field/subfield can be configured with the number of bits different from the number of bits depicted in FIG. 14. For clarity, explanation on content identical to FIG. 10 is omitted at this time.

Referring to FIG. 14, 20~23 bits corresponding to a region of the GTS length subfield of the legacy IEEE 802.15.4 aforementioned in FIG. 6 is used as a start sequence number subfield (GTS start sequence number) 1405. By maintaining the number of bits necessary for transmitting a GTS descriptor of the legacy IEEE 802.15.4, it is able to maintain compatibility with the legacy IEEE 802.15.4 system. Since the device has requested the GTS length subfield of the legacy IEEE 802.15.4 to the PAN coordinator in a manner of including the field in the GTS request command frame, the GTS length subfield of the legacy IEEE 802.15.4 can be omitted.

The start sequence number subfield 1405 indicates a sequence number of a superframe in which allocation of the periodic GTS allocated to the device starts. In this case, a value of the start sequence number subfield 1405 can be designated by a relative value indicating a superframe appearing after the number of superframes as many as a value of the GTS start sequence number designated from the current superframe. In particular, the value of the GTS start sequence number subfield 1405 can be indicated by a difference value (the number of superframes) between the current superframe and a first superframe of the periodic GTS requested by the device. For instance, a superframe appearing after (GTS start sequence number subfield value+1) from the current superframe may become the first superframe of the periodic GTS.

2.4. Persistent Scheduling Indicator

Figure 15:
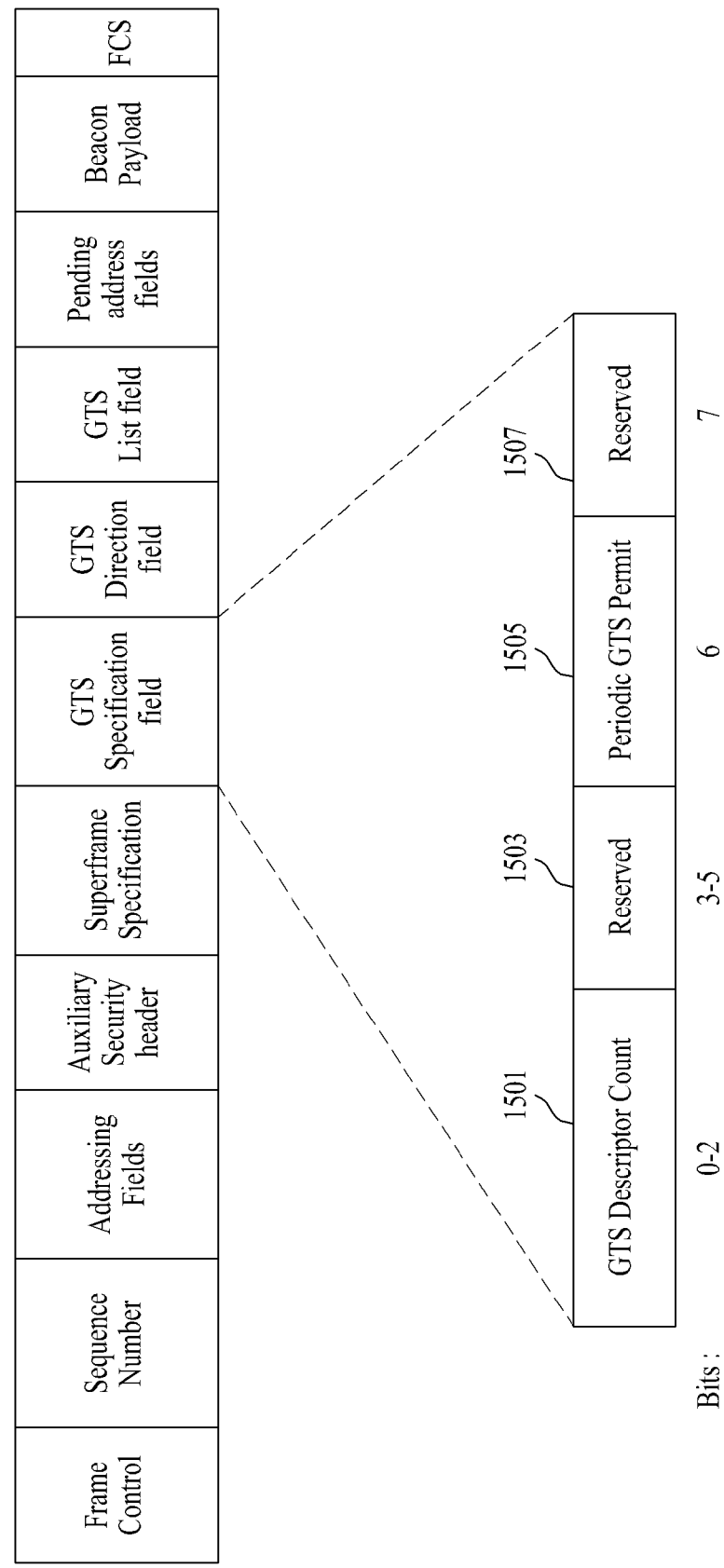
FIG. 15 is a diagram for a beacon frame structure according to one embodiment of the present invention.

FIG. 15 is a diagram for a beacon frame structure according to one embodiment of the present invention. In FIG. 15, the number of bits of each field/subfield is just an example. It is apparent that each field/subfield can be configured with the number of bits different from the number of bits depicted in FIG. 15.

Referring to FIG. 15, the PAN coordinator adds a periodic GTS permit subfield 1505 indicating whether the PAN coordinator supports a persistent scheduling, i.e., a periodic GTS allocation to a value of a GTS specification field of a beacon of IEEE 802.15.4 and the PAN coordinator may be then able to transmit the value of the GTS specification field to the device. In this case, if the value of the periodic GTS permit subfield 1505 corresponds to 0, it may indicate that the PAN coordinator does not permit the allocation of the periodic GTS. On the contrary, if the value of the periodic GTS permit subfield 1505 corresponds to 1, it may indicate that the PAN coordinator permits the allocation of the periodic GTS, and vice versa.

2.5. GTS Expiration

In case of using the persistent GTS allocation method proposed by the present patent, it is necessary to change the GTS expiration method of the legacy IEEE 802.15.4. This is because an unnecessary operation may occur. A GTS is not allocated to a single device and the GTS expiration method of the legacy IEEE 802.15.4 is not valid anymore due to periodicity of GTS allocation. Since synchronization for GTS expiration timing between the device and the PAN coordinator is not achieved due to the periodicity of the GTS allocation, although the expiration for the GTS allocated to the device has been performed in the PAN coordinator, the device may wait for data transmission or reception via the expired GTS. This sort of unnecessary operation may cause a problem of deteriorating a low power operation of the device in that the low power operation is one of main functions of the device in IEEE 802.15.4 system. In order to solve the aforementioned problem, the present invention proposes a GTS expiration method according to the persistent GTS allocation method. A GTS expiration method unmentioned in the proposed GTS expiration methods may identically follow the GTS expiration method of the legacy IEEE 802.15.4.

In case of allocating a periodic GTS, GTS expiration can be performed as follows. In particular, a scheme for determining a section (or duration) or timing for which the GTS expiration is performed can be defined in various ways.

2.5.1. First Scheme

The PAN coordinator can perform GTS expiration after at least (2×n) superframes in consideration of a GTS interval in a superframe to which a GTS is periodically allocated. The present scheme can be applied to both a transmit periodic GTS and a receive periodic GTS.

Specifically, in case of the transmit periodic GTS transmitting a GTS to the PAN coordinator by the device, if a data frame is not transmitted from the device for (2×n) superframes from a superframe in which a GTS allocation has been performed, the PAN coordinator can make the transmit periodic GTS to be expired. On the contrary, in case of the receive periodic GTS transmitting a GTS to the device by the PAN coordinator, after the PAN coordinator transmits data to the device using the GTS, if an ACK (acknowledgement) frame is not transmitted from the device for (2×n) superframes in the GTS, the PAN coordinator can make the receive periodic GTS to be expired.

As mentioned in the foregoing description, the GTS expiration occurs after at least (2×n) superframes. In this case, n value can be defined by a Formula 2 in the following.

$$n = 2^{(8-macBeaconOrder)} + \text{GTS interval (where } 0 \leq macBeaconOrder \leq 8)$$

$$n = 1 + \text{GTS interval (where } 9 \leq macBeaconOrder \leq 14) \quad \text{[Formula 2]}$$

2.5.2. Second Scheme

The PAN coordinator can perform GTS expiration after at least (2×n+GTS interval) in consideration of a GTS interval in a superframe to which a GTS is periodically allocated. The present scheme can be applied to both a transmit periodic GTS and a receive periodic GTS.

Specifically, in case of the transmit periodic GTS transmitting a GTS to the PAN coordinator by the device, if a data frame is not transmitted from the device for (2×n+GTS interval) superframes from a superframe in which a GTS allocation has been performed, the PAN coordinator can make the transmit periodic GTS to be expired. On the contrary, in case of the receive periodic GTS transmitting a GTS to the device by the PAN coordinator, after the PAN coordinator transmits data to the device using the GTS, if an ACK (acknowledgement) frame is not transmitted from the device for (2×n+GTS interval) superframes in the GTS, the PAN coordinator can make the receive periodic GTS to be expired.

As mentioned in the foregoing description, the GTS expiration occurs after at least (2×n+GTS interval) superframes. In this case, n value can be defined by a Formula 3 in the following.

$$n = 2^{(8-macBeaconOrder)} \text{ (where } 0 \leq macBeaconOrder \leq 8)$$

$$n = 1 \text{ (where } 9 \leq macBeaconOrder \leq 14) \quad \text{[Formula 3]}$$

2.5.3. Third Scheme

The PAN coordinator can perform GTS expiration after at least (2×n) superframes in consideration of a GTS interval in a superframe to which a GTS is periodically allocated. In this case, a timing of a superframe in which the GTS expiration is performed can be adjusted by an interval as much as a multiple of the GTS interval. In particular, n value can be configured with a multiple of the GTS interval. The present scheme can be applied to both a transmit periodic GTS and a receive periodic GTS.

Specifically, in case of the transmit periodic GTS transmitting a GTS to the PAN coordinator by the device, if a data frame is not transmitted from the device for (2×n) superframes from a superframe in which a GTS allocation has been performed, the PAN coordinator can make the transmit periodic GTS to be expired. On the contrary, in case of the receive periodic GTS transmitting a GTS to the device by the PAN coordinator, after the PAN coordinator transmits data to the device using the GTS, if an ACK (acknowledgement) frame is not transmitted from the device for (2×n) superframes in the GTS, the PAN coordinator can make the receive periodic GTS to be expired.

As mentioned in the foregoing description, the GTS expiration occurs after at least (2×n) superframes. In this case, n value can be defined by a Formula 4 of Formula 5 in the following.

$$n = 2^{(8-macBeaconOrder)} \times \text{GTS interval (where } 0 \leq macBeaconOrder \leq 8)$$

$$n = 1 \times \text{GTS interval (where } 9 \leq macBeaconOrder \leq 14) \quad \text{[Formula 4]}$$

$$n = 2(8-macBeaconOrder) \times \text{GTS interval (where } 0 \leq macBeaconOrder \leq 8)$$

$$n = 1 \times \text{GTS interval (where } 9 \leq macBeaconOrder \leq 14) \quad \text{[Formula 5]}$$

2.5.4. GTS De-Allocation Descriptor

As mentioned in the foregoing description, when a GTS de-allocation is performed, the legacy IEEE 802.1.5.4 standard defines that a GTS descriptor indicating de-allocation of a specific GTS is performed until after a subframe as much as a value of 'aGTSdescpersistencetime' parameter is included in a beacon.

Yet, in case of a persistent GTS scheduling, it may also change a parameter 'aGTSdescpersistencetime', which indicates a deadline of transmitting the GTS descriptor indicating that the GTS de-allocation has been performed. As an example of the parameter, the GTS descriptor indicating that the GTS de-allocation has been performed until after a subframe as much as a value of 'aGTSdescpersistencetime'× GTS interval' can be transmitted in the persistent GTS allocation method. In particular, after the GTS de-allocation, the PAN coordinator includes a GTS indicator indicating the GTS de-allocation in a beacon frame which is transmitted in every superframe within a superframe of the value of 'aGTS-descpersistencetime'×GTS interval' and may be then able to transmit the GTS indicator to the device.

And, the GTS descriptor may be periodically transmitted for the superframe of the value of 'aGTSdescpersistencetime'×GTS interval' in accordance with a superframe corresponding to a value of a GTS interval of the GTS. In particular, after the GTS de-allocation, the PAN coordinator includes the GTS indicator indicating the GTS de-allocation in a beacon frame, which is transmitted in a superframe according to the GTS interval of the GTS during the superframe of the 'aGTSdescpersistencetime'×GTS interval' value and may be then able to transmit the GTS indicator to the device.

3. General of Device to which the Present Invention is Applicable

Figure 16:
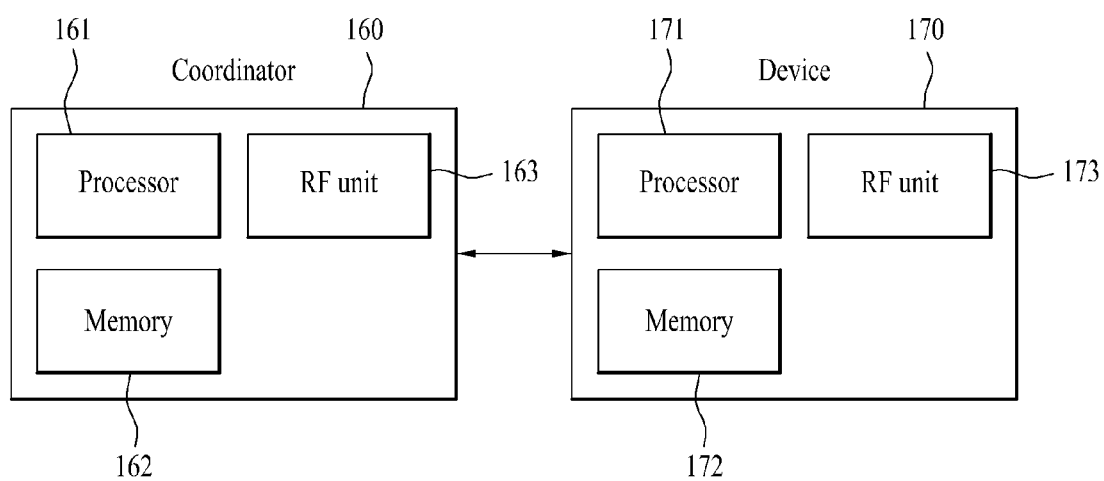
FIG. 16 is an example of a block diagram for a wireless communication device according to one embodiment of the present invention.

FIG. 16 is an example of a block diagram for a wireless communication device according to one embodiment of the present invention.

Referring to FIG. 16, a wireless communication system includes a coordinator 160 and a plurality of devices 170 situating at a region of the coordinator 160.

The coordinator 160 includes a processor 161, a memory 162 and a RF (radio frequency) unit 163. The processor 161 is configured to implement a proposed function, a procedure and/or a method. Layers of a radio interface protocol can be implemented by the processor 161. The memory 162 is connected with the processor 161 and stores various informations to drive the processor 161. The RF unit 163 is connected with the processor 161 and is configured to transmit/receive a radio signal.

The device 170 includes a processor 171, a memory 172 and a RF unit 173. The processor 171 is configured to implement a proposed function, a procedure and/or a method. Layers of a radio interface protocol can be implemented by the processor 171. The memory 172 is connected with the processor 171 and stores various informations to drive the processor 171. The RF unit 173 is connected with the processor 171 and is configured to transmit/receive a radio signal.

The memory 162/172 can be positioned at an inside or an outside of the processor 161/171 and can be connected to the processor 161/171 with a well-known means. And, the coordinator 160 and/or the device 170 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a method proposed by the present invention is described with reference to examples applied to IEEE 802.15.4 system, the method can be applied to various kinds of wireless access systems as well as the IEEE 802.15.4 system.

What is claimed is:

1. A method of allocating a GTS (guaranteed time slot) in a WPAN (wireless personal area network) system, the method comprising:
   receiving a GTS request command for requesting allocation of a periodic GTS from a device; and
   transmitting a beacon frame comprising periodic GTS allocation information to the device,
   wherein a GTS allocation period is determined by GTS period information included in the GTS request command,
   wherein when data or an ACK (acknowledgement) frame is not received from the device for a period of (2×n) superframes, an allocated periodic GTS expires, and
   wherein n is equal to $P \times 2^{(8-m)}$ when $0 \leq m \leq 8$, and n is equal to P when $9 \leq m \leq 14$, where P indicates the GTS allocation period and m indicates a frequency with which the beacon frame is transmitted to the device.

2. The method of claim 1, wherein the GTS allocation period is determined by exponentiating the GTS period information.

3. The method of claim 1, further comprising transmitting information on whether allocation of the periodic GTS is supported to the device via the beacon frame.

4. The method of claim 3, wherein the beacon frame comprises a GTS specification field, and the GTS specification field comprises a periodic GTS permit subfield indicating whether the allocation of the periodic GTS is supported.

5. A method of receiving allocation of a GTS (guaranteed time slot) in a WPAN (wireless personal area network) system, comprising:

transmitting a GTS request command for requesting allocation of a periodic GTS to a coordinator; and
receiving a beacon frame comprising periodic GTS allocation information from the coordinator,
wherein a GTS allocation period is determined by GTS period information included in the GTS request command,
wherein when data or an ACK (acknowledgement) frame is not transmitted to the coordinator for a period of (2×n) superframes, an allocated periodic GTS expires, and
wherein n is equal to $P \times 2^{(8-m)}$ when $0 \leq m \leq 8$, and n is equal to P when $9 \leq m \leq 14$, where P indicates the GTS allocation period and m indicates a frequency with which the beacon frame is received from the coordinator.

6. The method of claim 5, wherein the GTS allocation period is determined by exponentiating the GTS period information.

7. The method of claim 5, further comprising receiving information on whether allocation of the periodic GTS is supported from the coordinator via the beacon frame.

8. The method of claim 7, wherein the beacon frame comprises a GTS specification field, and the GTS specification field comprises a periodic GTS permit subfield indicating whether the allocation of the periodic GTS is supported.

9. A coordinator allocating a GTS (guaranteed time slot) in a WPAN (wireless personal area network) system, the coordinator comprising:
an RF (radio frequency) unit configured to transceive a radio signal; and
a processor configured to receive a GTS request command for requesting allocation of a periodic GTS from a device and transmit a beacon frame comprising periodic GTS allocation information to the device through the RF unit,
wherein a GTS allocation period is determined by GTS period information included in the GTS request command,
wherein when data or an ACK (acknowledgement) frame is not received from the device for a period of (2×n) superframes, an allocated periodic GTS expires, and
wherein n is equal to $P \times 2^{(8-m)}$ when $0 \leq m \leq 8$, and n is equal to P when $9 \leq m \leq 14$, where P indicates the GTS allocation period and m indicates a frequency with which the beacon frame is transmitted to the device.

10. The coordinator of claim 9, wherein the GTS allocation period is determined by exponentiating the GTS period information.

11. The coordinator of claim 9, wherein the processor is further configured to transmit information on whether allocation of the periodic GTS is supported to the device via the beacon frame.

12. The coordinator of claim 11, wherein the beacon frame comprises a GTS specification field, and the GTS specification field comprises a periodic GTS permit subfield indicating whether the allocation of the periodic GTS is supported.

13. A device receiving allocation of a GTS (guaranteed time slot) in a WPAN (wireless personal area network) system, the device comprising:
an RF (radio frequency) unit configured to transceive a radio signal; and
a processor configured to transmit a GTS request command for requesting allocation of a periodic GTS to a coordinator and receive a beacon frame comprising periodic GTS allocation information from the coordinator through the RF unit,
wherein a GTS allocation period is determined by GTS period information included in the GTS request command, and
wherein when data or an ACK (acknowledgement) frame is not transmitted to the coordinator for a period of (2×n) superframes, an allocated periodic GTS expires, and
wherein n is equal to $P \times 2^{(8-m)}$ when $0 \leq m \leq 8$, and n is equal to P when $9 \leq m \leq 14$, where P indicates the GTS allocation period and m indicates a frequency with which the beacon frame is received from the coordinator.

14. The device of claim 13, wherein the GTS allocation period is determined by exponentiating the GTS period information.

15. The device of claim 13, wherein the processor is further configured to receive information on whether allocation of the periodic GTS is supported from the coordinator via the beacon frame.

16. The device of claim 15, wherein the beacon frame comprises a GTS specification field, and the GTS specification field comprises a periodic GTS permit subfield indicating whether the allocation of the periodic GTS is supported.

* * * * *